United States Patent
Jüngermann et al.

(10) Patent No.: US 7,384,576 B1
(45) Date of Patent: Jun. 10, 2008

(54) LEAD-FREE MIXTURE AS A RADIATION PROTECTION ADDITIVE

(75) Inventors: Hardy Jüngermann, Werl (DE);
Jürgen Kirsch, Leverkusen (DE);
Heinz Pudleiner, Krefeld (DE);
Burkhard Werden, Leverkusen (DE);
Edgar Leitz, Dormagen (DE); Detlev Joachimi, Krefeld (DE);
Peter-Alexander Gottschalk, Köln (DE); Klaus Zander, Mülheim (DE);
Klaus Mader, Marienheide (DE);
Richard Kopp, Köln (DE); Alexander Iwanovitsch Korschunow, Sarov (RU);
Konstantin Awtonomowitsch Kapitanow, Sarov (RU); Gennadij Grigorjewitsch Sawkin, Sarov (RU);
Wladimir Michajlowitsch Nikitin, Sarov (RU); Jelena Saweljewna Nasarowa, Sarov (RU); Igor Leonidowitsch Ryshakow, Sarov (RU)

(73) Assignee: LANXESS Deutschland GmbH, Leverkusen (DE)

(*) Notice: Subject to any disclaimer, the term of this patent is extended or adjusted under 35 U.S.C. 154(b) by 527 days.

(21) Appl. No.: 10/734,680

(22) Filed: Dec. 12, 2003

(30) Foreign Application Priority Data

Dec. 17, 2002 (DE) ............... 102 58 878
Aug. 30, 2003 (DE) ............... 103 40 124

(51) Int. Cl.
G21F 1/10 (2006.01)

(52) U.S. Cl. ............ 252/478; 252/301.1; 523/137; 524/403; 524/413; 524/439; 524/440

(58) Field of Classification Search ........... 252/478
See application file for complete search history.

(56) References Cited

U.S. PATENT DOCUMENTS

| | | | | |
|---|---|---|---|---|
| 3,751,387 A | * | 8/1973 | Hall et al. | 252/478 |
| 3,950,271 A | * | 4/1976 | Linares et al. | 252/478 |
| 4,123,392 A | * | 10/1978 | Hall et al. | 252/478 |
| 4,129,524 A | | 12/1978 | Nagai et al. | 252/478 |
| 4,182,821 A | | 1/1980 | Nagai et al. | 526/240 |
| 4,563,494 A | | 1/1986 | Ida | 524/398 |
| 4,566,989 A | * | 1/1986 | Radford et al. | 252/478 |
| 5,015,863 A | * | 5/1991 | Takeshima et al. | 250/515.1 |
| 5,700,962 A | * | 12/1997 | Carden | 75/236 |
| 6,548,570 B1 | | 4/2003 | Lange | 523/137 |
| 2002/0185614 A1 | * | 12/2002 | Joseph | 250/507.1 |
| 2003/0032192 A1 | | 2/2003 | Haubold et al. | 436/56 |

FOREIGN PATENT DOCUMENTS

| | | |
|---|---|---|
| CA | 815609 | 6/1969 |
| CA | 2003877 | 5/1990 |
| GB | 943714 | 12/1963 |
| GB | 954593 | 4/1964 |
| GB | 1122786 | 8/1968 |
| GB | 1 200 614 | 7/1970 |
| GB | 1 603 055 | 11/1981 |
| JP | 53-9995 | 1/1978 |
| JP | 57-141430 | 9/1982 |
| JP | 58-53928 | 3/1983 |
| JP | 59-126296 | 7/1984 |
| JP | 60-2360 | 1/1985 |
| JP | 61-228051 | 10/1986 |

* cited by examiner

Primary Examiner—Joseph D. Anthony
(74) Attorney, Agent, or Firm—Nicanor A. Kohncke

(57) ABSTRACT

The present invention provides a mixture containing a) at least 26 wt. % of gadolinium and b) one or more elements, alloys and/or compounds from the group consisting of barium, indium, tin, lanthanum, molybdenum, niobium, tantalum, zirconium and tungsten, a process for the preparation of this mixture, use of the mixture as radiation protection, use of the mixture to prepare polymeric radiation protection substances, a process for preparing radiation screening rubbers, thermoplastic materials and polyurethanes, a process for preparing products from the polymeric radiation protection substances and products made from these polymeric radiation protection substances.

19 Claims, No Drawings

LEAD-FREE MIXTURE AS A RADIATION PROTECTION ADDITIVE

FIELD OF THE INVENTION

The present invention provides a mixture containing a) at least 26 wt. % of gadolinium and b) one or more elements, alloys and/or compounds of the group consisting of barium, indium, tin, lanthanum, molybdenum, niobium, tantalum, zirconium, tungsten or mixture thereof, a process for the preparation of this mixture, use of the mixture as radiation protection, use of the mixture to prepare polymeric radiation protection substances, a process for preparing radiation-shielding rubbers, thermoplastic materials and polyurethanes, a process for preparing products from the polymeric radiation protection substances and products made from these polymeric radiation protection substances.

BACKGROUND OF THE INVENTION

Humans are increasingly subjected to ionizing radiation from a number of sources. The radiation occurs in the form of high-energy electromagnetic radiation, such as X-ray or gamma-radiation. It cannot be detected directly by humans. Depending on the type and duration of exposure to radiation, however, one's health can be damaged.

The effects of such energy-rich radiation can occur intentionally, e.g. in the medical application of ionizing rays during diagnostic or therapeutic X-ray treatment or in nuclear medicine, in non-destructive materials testing, in radiometry or in special measuring techniques using devices which contain radioactive substances, or unintentionally, e.g. when operating defective radiation emitters such as acceleration units, electron microscopes, electronic welding plant, electron tubes or monitors. When operating X-ray devices or other radiation emitting instruments, the unintended effects of radiation on the operator or third parties may occur. Therefore many precautions are applied to protect the operator or third parties from this radiation. In many cases it is then not possible to operate the devices mentioned above, or only when third parties are not present. In many cases also, complete separation of the operating staff from the source of radiation is not possible, and also not practicable, because the operator can only operate the equipment in the immediate vicinity of the equipment and the source of radiation. This applies in particular for the medical use of X-rays in X-ray diagnostics and X-ray therapy when structural radiation protective measures have to be used on the apparatus and personal protection equipment has to be used in order to screen the operating staff and/or the patients from the radiation, with the exception of areas where the radiation is actually required.

Typical radiation protection materials contain flat materials, in particular metallic lead or lead compounds or lead blends. Lead and its compounds are frequently used to protect against X-radiation and gamma-radiation. Lead has the advantage that it is available at low cost, has a high density and also has a high atomic number. It is, therefore, a good absorber of ionizing radiation, e.g. X-radiation which is produced with accelerating potentials of 40 to 300 kV. The disadvantage of lead is that, due to the photoelectric effect, the degree of attenuation of lead is relatively small at low energies of the ionizing radiation. Also, lead has questionable toxicological properties. On top of that, there is the great weight of lead-containing protective equipment.

Thus, there is a great need for materials which exhibit similarly effective screening properties with regard to ionizing radiation as those of lead but which are substantially lighter, more environmentally friendly and more toxicologically acceptable than lead.

JP 58-053828 (K. Yamamoto) describes an elastic rubber-like foam material based on polychloroprene rubber which contains large amounts (80-87.3 wt. %) of metal compounds, e.g. lead oxide.

JP-57-141430 discloses a lead-containing foamed material which consists of natural rubber or synthetic rubber and contains lead compounds at the rate of 300 or more parts by weight per 100 parts by weight of the base material.

CA-A 815 609 describes a flexible material which consists of a braided base layer and a lead-containing elastomer layer, at least one surface of which is glued to the base layer. The base layer contains lead particles with a size of <200 mesh. The lead makes up at least 65 wt. % of the total weight of the material. The preferred elastomer material is neoprene (polychloroprene).

JP 61-228051 discloses compositions of ethylene/vinyl acetate and/or ethylene/ethyl acrylate copolymers which contain 5 to 50 parts of antimony oxide and 5 to 100 parts of barium sulfate per 100 parts of polymer as cable casing. The disadvantage of this composition is the high proportion of antimony oxide which is classified as a carcinogenic compound.

Compositions of metallic lead in polyvinylchloride for the absorption of X-radiation are described in GB-A 1 603 654 and GB-A 1 603 655.

JP 59-126296 describes a coated composition for screening against radiation, which contains lead or lead compounds in a copolymer and is applied to plasticized polyvinylchloride.

A flexible material for screening against radiation, consisting of an elastomer matrix which contains a homogeneous distribution of filler particles, is described in GB-A 1 122 786. The filler is formed from a mixture of ionizing radiation absorbing metal and at least one other metal. Lead and lead/antimony alloys are used in this case.

GB-A 954 593 describes screenings against ionizing radiation which are presented in the form of lead coated fabrics which have been immersed in mercury and thereby form lead amalgams, and thus improve the flexibility of the coated fabric.

Radiation screening materials which also contain a lead-containing methacrylate plastics material are disclosed in JP-2360/1960, JP-9994/1978, JP-9995/1978, JP-9996/1978 and JP-63310/1978.

EP-A 371 699 discloses radiation screening materials which, in a preferred embodiment, are an inorganic mixture of lead, actinium, bismuth, gold, mercury, polonium, thallium, thorium, uranium, iridium, osmium, platinum, rhenium, tantalum, tungsten, bromine, molybdenum, rhodium, strontium or zirconium and inter alia cerium or lanthanum. 70 to 93 wt. %, or preferably in fact 70 to 90 wt. % of the mixture is used in copolymers of ethylene and alkyl acrylate, alkyl methacrylate, glycidyl methacrylate, acrylic acid, methacrylic acid. In the preferred embodiment, 5 to 10 wt. % of plasticizer is also added.

U.S. Pat. No. 4,563,494 describes lanthanoid compounds which can be used in polyacrylates, polymethacrylates, polystyrene and copolymers thereof in amounts of 0.001 to 10 wt. %. In that document it is expressly pointed out that complete screening against X-ray or gamma radiation is possible only in combination with lead compounds (column 5; lines 57 to 61).

In both DE-A 199 55 192 and EP-A 0 371 699 powdered metals with high atomic numbers are referred to as X-radiation absorbing fillers in elastomers, wherein high proportions of metallic tin of 50-100 wt. % are cited in particular. The use of at least 26 wt. % of gadolinium from gadolinium oxide is not disclosed.

GB-A 943 714 describes compositions for preparing a material which screens against X-radiation and which consists of a silicone elastomer with powdered tungsten as an additive.

In particular in the region of high-energy X-radiation of 90 kV to 150 kV accelerating potential, the materials provided in DE-A 199 55 192 and GB-A 943 714 do not offer any weight advantage, for the same screening properties, over lead.

Thus, in all the known processes, either lead or antimony or their compounds in high concentration, or ecologically unacceptable substances such as mercury, polonium or uranium and/or substance mixtures with high basic proportions of metal such as e.g. antimony, are used. Often, the radiation protection substances used in the known processes do not adequately screen against high-energy X-radiation in the region of 90 to 150 kV accelerating potential.

The object of the present invention is to provide, as compared with the prior art and the still preferably used lead-containing materials, lighter, more toxicologically acceptable, completely lead-free mixtures which screen against ionizing radiation, such as e.g. X-radiation or gamma radiation, better than lead.

SUMMARY OF THE INVENTION

The present invention relates to a mixture containing
a) at least 26 wt. % of gadolinium as the element and/or gadolinium compounds and/or gadolinium alloys,
b) at least 10 wt. % of one or more elements and/or alloys and/or compounds of these elements chosen from the group consisting of barium, indium, tin, molybdenum, niobium, tantalum, zirconium and tungsten, wherein the concentration of tungsten, if tungsten is present, is at least 10 wt. % with respect to the total amount of mixture.

DETAILED DESCRIPTION OF THE INVENTION

The mixture can also contain 0 to 64 wt. % of a component c) which contains one or more elements and/or alloys and/or compounds of these elements chosen, from the group consisting of bismuth, lanthanum, cerium, praseodymium, neodymium, promethium, samarium, europium, terbium, dysprosium, holmium, erbium, thulium, ytterbium and lutetium.

The mixture according to the present invention can contain at most 50 wt. % of tin.

The elements and/or alloys and/or compounds of component b) in the mixture according to the present invention can exhibit a complementary radiation attenuating characteristic in the region of 10 to 600 keV.

The mixture according to the present invention can contain at least 35 wt. % of gadolinium and at least 20 wt. % of tungsten.

The specific density of the mixture according to the present invention can be 4.0 to 13.0 g/cm$^3$.

The particles in the mixture according to the present invention can have an average particle diameter in the range 0.1 to 200 µm.

Components b) and c) in the mixture according to the present invention can be chosen, from the group consisting of oxides, carbonates, sulfates, halides, hydroxides, tungstates, carbides and sulfides.

The present invention also provides a process for preparing the mixture according to the present invention, wherein the components of the mixture are dried in the temperature range 20 to 500° C., then screened and then mixed for in the region of 5 minutes to 24 hours.

The present invention also provides use of the mixture according to the present invention as radiation protection.

The mixture according to the present invention can be used to prepare polymeric radiation protection substances.

The present invention also provides a polymeric radiation protection substance which contains the mixture according to the present invention.

The polymeric radiation protection substance which contains the mixture according to the present invention can also contain other additives.

The polymer in the polymeric radiation protection which contains the mixture according to the present invention can be chosen from the group consisting of rubbers, thermoplastic materials and polyurethanes.

The degree of filling of the polymeric radiation protection substance which contains the mixture according to the present invention can be less than 80 wt. %.

The polymeric radiation protection substance which contains the mixture according to the present invention contains
 a) 5 to 85 wt. % of rubber, thermoplastic material or polyurethane and
 b) 10 to 80 wt. % of the mixture described above and
 c) 5 to 20 wt. % of other additives.

The present invention also provides a process for preparing a polymeric radiation protection substance which contains the mixture according to the present invention, wherein the polymer is reacted with the mixture according to the present invention.

The process for preparing a polymeric radiation protection substance which contains the mixture according to the present invention includes, for example, compounding together a polymer, such as rubber, with the mixture according to the present invention.

The process for preparing a polymeric radiation protection substance which contains the mixture according to the invention, also includes, for example, mixing a polymer, such as a thermoplastic material, with the mixture according to the present invention.

The process for preparing a polymeric radiation protection substance which contains the mixture according to the invention also includes a process in which the polymer is polyurethane and the starting materials for the polyurethane are mixed directly with the mixture according to the invention and then polymerized.

The present invention also provides a process for producing a product, wherein the polymeric radiation protection substance which contains the mixture according to the present invention is used.

The present invention also provides a product obtainable by using the process to produce a product in which the polymeric radiation protection substance which contains the mixture according to the present invention is used.

The mixture according to the present invention contains at least 26 wt. % of gadolinium as the element and/or derived from compounds and/or alloys. The mixture according to the present invention can contain a proportion of gadolinium in the range 35 to 55 wt. %.

Component b) in the mixture according to the present invention contains at least 10 wt. % of one or more elements, alloys and/or compounds of these elements chosen, independently of each other, from the group consisting of barium, indium, tin, molybdenum, niobium, tantalum, zirconium and tungsten, wherein the concentration of tungsten, if tungsten is present, is at least 10 wt. % with respect to the total amount of mixture. Elements, alloys and/or compounds which have a radiation attenuating characteristic in the range 10 to 300 keV are useful. For example, barium, tin, tungsten and molybdenum. The proportion of component b) in the mixture according to the present invention is in the range 10 to 74 wt. %, or for example in the range 20 to 60 wt. %, or further for example, in the range 25 to 50 wt. %. The proportion of tin can be less than 50 wt. %, with respect to the weight of the entire mixture.

Component c) in the mixture according to the present invention contains one or more elements, alloys and/or compounds of these elements chosen, independently of each other, from the group consisting of bismuth, lanthanum, cerium, praseodymium, neodymium, promethium, samarium, europium, terbium, dysprosium, holmium, erbium, thulium, ytterbium and lutetium. Or for example, the elements, alloys and/or compounds of bismuth, lanthanum, cerium, praseodymium, neodymium, samarium and europium are used. The proportion of component c) in the mixture according to the present invention is in the range 0 to 64 wt. %, or, for example, in the range 20 to 50 wt. %, or further for example, in the range 25 to 40 wt. %.

Component a) can be used in the form of its compounds, such as oxides.

Component c) can be used in the form of its compounds. Useful compounds for components b) and c) include oxides, carbonates, sulfates, hydroxides, tungstates, carbides, sulfides or halides of the elements mentioned. Or for example compounds for components b) and c) include oxides, sulfates and tungstates. Or, for example, compounds barium sulfate, indium oxide and tin oxide or the metals tin, molybdenum, niobium, tantalum, zirconium and tungsten are used for component b) and the compounds bismuth oxide, lanthanum oxide, cerium oxide, praseodymium oxide, promethium oxide, samarium oxide, europium oxide, terbium oxide, dysprosium oxide, holmium oxide, erbium oxide, thulium oxide, ytterbium oxide and lutetium oxide are used for component c).

To prepare the mixture according to the present invention, the individual constituents of component a) and of component b) are dried at temperatures in the range 30 to 500° C. Then the individual constituents of the two components a) and b) are screened with a sieve in the range 3 to 125 µm mesh size. The constituents of components a) and b) obtained are then mixed for 5 minutes to 24 hours in mixers which are well-known to a person skilled in the art, such as propeller, turbo, blade, trough, planetary, attrition, screw, roller, centrifugal, countercurrent, jet, drum, conical, tumble, rotary, cooling, vacuum, continuous flow, gravity, fluid-bed and pneumatic mixers. Tumble mixers can be used. The specific density of the mixture according to the present invention is in the range 4.0 to 13.0 g/cm$^3$, or in the range 6.0 to 10 g/cm$^3$. A corresponding procedure is used for a mixture which also contains component c).

In addition, other additives may also be present in the mixture according to the present invention. Other additives are understood to be those well-known to a person skilled in the art such as UV absorbers, plasticizers, waxes, mould release agents, antioxidants, heat stabilizers, pigments, inorganic extenders, dyes as well as other compounds which screen against radiation. For example, additives include plasticizers such as ethers, ether-thioethers, esters with thioether groups, sulfonates, adipates, (poly)phthalates, citrates, phosphates. These additives can be present in the mixture according to the invention in proportions of 0 to 30 wt. %, or, for example, 10 to 20 wt. %, or further, for example, 5 to 15 wt. %.

The mixture according to the present invention is used as a screening material (radiation protection) against X-ray and gamma radiation. The mixture according to the present invention is preferably used for absorptions in the range 10 to 600 keV, or, 80 to 400 keV. For example, the types of constituents in the mixture according to the present invention and their ratio to each other provides a weight reduction of 50% of the absorption material being used as compared with a single absorption element such as lead; or else, for the same weight as of lead of absorption elements, alloys or compounds within the mixture according to the present invention, a certain composition of the mixture according to the present invention can produce about a 150% higher absorption than the lead equivalent. The lead equivalent is understood to be the screening capacity possessed by lead with the same weight as the mixture being assessed. For component b), 15 to 60 wt. %, or, for example, 25 to 50 wt. % of tungsten, tin or tin oxide or mixtures thereof and for component c), 20 to 50 wt. %, or, for example, 25 to 40 wt. % of bismuth oxide, lanthanum oxide, cerium oxide, praseodymium oxide, neodymium oxide, samarium oxide, europium oxide and gadolinium oxide or mixtures thereof, are used. The tin content can be less than 50 wt. % and the tungsten content can be greater than 10 wt. %.

The mixture according to the present invention can also be introduced as radiation protection into all polymers known to a person skilled in the art. Useful polymers include all the rubbers, thermoplastic materials and polyurethanes known to a person skilled in the art.

The mixture according to the present invention should be compatible with the plastics component because physical interactions between the plastics component and the mixture according to the present invention may be produced which can have an effect on the properties of the polymeric radiation protection substance being produced. Thus, for example, oxides can be dispersed better than the corresponding metals in the polymeric radiation protection substance so the mixture according to the present invention can be distributed more uniformly in the polymeric radiation protection substance matrix. Better mechanical properties such as breaking strength or tear propagation resistance arise there from. The constituents of the mixture according to the present invention are used in powder form and are distributed homogeneously in the polymer.

When blending the mixture according to the present invention with the polymer or when dispersing in the polymer-forming raw materials, average particle diameters of 0.1 to 200 µm, or, for example, 0.5 to 100 µm, are used.

The proportion of the mixture according to the present invention in the polymeric radiation protection substance depends on the energy of the radiation being screened and also on the compatibility of the mixture with the polymer. The polymeric radiation protection substance contains 10 to 90 wt. %, or, for example, 10 to 80 wt. %, or, further, for example, 15 to 70 wt. % of the mixture according to the present invention.

The mixture according to the present invention can either be added to the starting materials for the polymers before polymerization or else be incorporated later into the polymer. The mixture according to the present invention can be incorporated into rubbers and thermoplastic materials after polymerization, whereas when preparing the polymeric radiation protection substance which uses polyurethane as the polymer, the mixture according to the invention can be added to the starting materials just before polymerization. Incorporation of the mixture according to the present invention into the polymer after polymerization is performed by processing possibilities which are well-known to a person skilled in the art such as compounding, melting, cold pressing, hot pressing, calandering, injection molding, extruding, sintering or transfer molding. The polymeric radiation protection substances containing the mixture according to the present invention can be prepared by adding the components to the melt-compounding or comparable process, wherein the process used depends to some extent on the polymeric radiation protection substance being prepared and/or on the melt characteristics of the polymer. Examples of compounding equipment which can be used are twin roller mills, Banbury mixers, Farrell mixers, Buss compounders, Gelimat intensive mixers and comparable mixers. The mixture according to the present invention can also be prepared in a Banbury twin rotor mixer, when all the components are placed in the mixer together. However, it may also be useful first to prepare a concentrate or master batch of the mixture according to the present invention in the polymer in order to prepare the combination in the concentrates in a high viscosity mixer. The polymeric radiation protection substance obtained in this way can then be processed further and be shaped to give sheets by means of extrusion, calandering, compression forming or other processing possibilities known to a person skilled in the art.

Therefore, the processes for preparing polymeric radiation protection substances which contain the mixture according to the present invention are not restricted, so a variety of processes can be used. Therefore, a process in which the mixture according to the present invention is blended with the polymer or a process in which the mixture according to the present invention is dispersed in the polymer-forming raw material and this polymer-forming raw material is polymerized can be used or a process is performed in which the mixture according to the present invention is mixed with or suspended in a solvent in order to have an effect on the polymerization procedure.

The mixture according to the present invention is especially useful as a screening material against X-ray and gamma radiation. This mixture according to the present invention can be used to produce polymeric radiation protection substances from which aprons, housings, surgical gloves, partitions and other items suitable for screening against ionizing radiation are used. Such properties are especially important for structural radiation protective modifications to apparatus or personal radiation equipment against ionizing radiation in which better protection is required or the same protection is required, but at the same time involving less weight for the protective devices, as compared with traditional materials, and offering important advantages to the user, for example, with regard to the radiation protection and/or wearer comfort of protective clothing. The mixture according to the present invention has a higher radiation protection (attenuation factors) than lead against X-ray or gamma radiation with energies greater than 10 keV, with respect to the weight of lead or lead compound used. Thus, in comparison to lead, the same protection is produced with less weight or greater protection is produced with the same weight, because more of the radiation is absorbed. The improved attenuation factor refers to a specific X-ray or gamma energy (wavelength) and can be optimized for each individual energy spectrum by a choice of mixture components. The mixture according to the present invention attenuates more strongly and therefore provides protection over a wider range of the (ionizing) electromagnetic spectrum than metallic lead, lead compounds or other absorbent materials made from a single element.

The mixture according to the present invention can be incorporated into rubbers by processes known to a person skilled in the art. The expression rubber is understood to include all elastomers known to a person skilled in the art. Natural rubber, polychloroprene, acrylonitrile rubber, ethylene/vinylacetate copolymers, hydrogenated acrylonitrile rubber, styrene/butadiene rubber, ethylene/propylene rubber or ethylene/propylene terpolymers (EPDM), isobutylene/isoprene rubber or halogenated isopropylene/isoprene rubber, silicone rubber or their blends with each other or with thermoplastic polymers such as polyethylene, polypropylene, polyvinylchloride can be used. For example, Ethylene/vinylacetate copolymers (Levapren®), polychloroprene (Baypren®), ethylene/propylene terpolymers, natural rubber can be used. The rubber may contain additives which are conventionally used by a person skilled in the art. Conventional additives are understood to include cross-linking systems such as 2 to 5 parts by wt. of zinc oxide, 2 to 4 parts by wt. of 3-methyl-thiazolidine-thione-2 and 0.5 to 1.5 parts by wt. of zinc dibenzyldithiocarbamate for polychloroprene rubbers or 4 to 7 parts by wt. of α,α'-bis-(t-butylperoxy)-diisopropylbenzene in combination with 0 to 4 parts by wt., preferably 2 to 4 parts by wt. of activators such as triallyl cyanurate, triallyl isocyanurate or N,N'-m-phenylene dimaleic imide for ethylene/vinylacetate copolymers or 0.5 to 2.5 parts by wt. of benzothiazyl-2-cyclohexyl sulfenamide, 0 to 1.5 parts by wt. of tetramethylthiuram disulfide or 0 to 1.5 parts by wt. of dimethyldiphenylthiuram disulfide and 1 to 1.3 parts by wt. of sulfur for natural rubber. Anti-ageing agents are understood to be materials such as N-isopropyl-N'-phenyl-p-phenylenediamine, N-(1,3-dimethylbutyl)-1-N'-phenyl-p-phenylene-diamine, N,N'-bis-(1,4-dimethylpentyl)-p-phenylenediamine, 2,2'-methylene-bis-(4-methyl-6-tert-butylphenol), N,N'-diphenyl-p-phenylenediamine, styrenated diphenylamine, polymerized 2,2,4-trimethyl-1,2-dihydroquinoline or styrenated phenol in concentrations of 1 to 3 parts by wt. Inactive and active fillers are understood to be additives such as carbon blacks, silicas with various activities and with various surface areas or chalk, kaolin or clay at 0 to 60 parts by wt., inorganic dyes such as titanium dioxide or iron oxide at 1 to 5 parts by wt., processing aids such as fatty acids, fatty esters, fatty alcohols in concentrations of 0 to 5 parts by wt., stabilizers such as 2,2'-methylene-bis-(4-methyl-6-tert-butylphenol) at 0.5 to 3 parts by wt. In general, accelerators from the class of sulfenamides such as N-cyclohexylbenzothiazyl sulfenamide (CBS), N-tert.-butyl-2-benzothiazyl sulfenamide (TBBS), benzothiazyl-2-sulfenomorpholides (MBS), N,N-dicylcohexylbenzothiazol-2-sulfenamide (DCBS), mercapto accelerators such as 2-mercaptobenzothiazole (MBT), zinc 2-mercaptobenzothiazole (ZMBT), benzothiazyl disulfide (MBTS), thiurams such as tetramethylthiuram disulfide (TMTD), dithiocarbamates such as zinc diethyldithiocarbamate (ZDEC), zinc ethylphenyldithiocarbamate (ZEPC), zinc dibenzyldithiocarbamate (ZBEC) or guanidines such as diphenylguanidine (DPG) can be used in combination with sulfur. Peroxide cross-linking agents which can be used are substances such as 2,5-dimethyl-2,5-di-(tert-butylperoxy)-hexene-3,2,5-dimethyl-2,5-di-(tert-butylperoxy)-hexane, di-(tertbutylperoxyisopropyl)-benzene, tert-butylcumyl peroxide, dicumyl peroxide, butyl-4,4-di-(tert-butylperoxy)-valerate, 1,1-di-(tert-butylperoxy)-3,3,5-trimethylcyclohexane, in concentrations of 2 to 7 parts by wt., are use alone or in combination with 2 to 4 parts by wt.

of activators such as triallyl cyanurate, triallyl isocyanurate, N,N'-m-phenylenedimaleic imide or trimethylolpropane trimethacrylate.

The mixture according to the present invention, in an amount up to 6 times the weight of the polymer material, can be added to the pre-masticated rubber on/in a mixer (compounder/rollers) within 10 to 15 minutes, followed by other conventional fillers, plasticizers, processing aids, the cross-linking system and the stabilizers, these being added within 3 to 5 minutes.

The further processing of the mixture according to the present invention can be performed using processing methods, such as calandering, known to a person skilled in the art. The cross-linking of the polymer matrix which is required is also performed using methods known to a person skilled in the art, such as vulcanization after the shaping procedure.

Suitable thermoplastic materials include all thermoplastic materials known to a person skilled in the art. Polyalkylene terephthalates, aromatic polyesters, polyamides, polycarbonate, thermoplastic polyurethanes (TPU), polyacrylate, polymethacrylate, acrylonitrile/butadiene/styrene (ABS) graft copolymers, polyolefins such as polyethylene or polypropylene, polystyrene, polyvinylchloride, polyoxymethylene, polyimide, polyethers and polyetherketones, which may be used individually or as a blend of different polymers, can be used. Polyamide-6s such as Durethen® B315, ABS plastics such as Lustran® ABS M 203 FC, polycarbonates such as Makrolon® Rx 1805 or Makrolon® 2808, polybutylene terephthalates such as Pocan® B 1300 or thermoplastic polyurethanes such as Desmopan® 385 or Desmopan® 786 can be used.

Polyamides can be synthesized by a variety of processes and from very different building blocks and in special cases of application can be incorporated alone or in combination with processing aids, stabilizers, polymeric alloying partners such as elastomers or also reinforcing materials such as mineral fillers or glass fibers to give materials with specific adjusted combinations of properties. Blends with a proportion of other polymers such as polyethylene, polypropylene or ABS are also suitable. The properties of polyamides, such as with regard to the impact resistance of reinforced polyamides, can be improved by the addition of elastomers. The number of combinations possible enables a very large number of products with very different properties, such as low temperature impact resistance or ease of flow.

A number of procedures are known for preparing polyamides, wherein, depending on the end product required, different monomeric building blocks, different chain transfer agents to adjust the molecular weight striven for, or else monomers with reactive groups such as amino, hydroxy, carboxy, carboxylate, carboxylic chloride and/or carboxylic anhydride groups for subsequent planned post treatments, are used.

The technically relevant processes for preparing polyamides are based on polycondensation in the melt. In this context, the hydrolytic polymerization of lactams is also understood to be a polycondensation process.

Preferred polyamides are partly crystalline polyamides which can be prepared starting from diamines and dicarboxylic acids and/or lactams with at least 5 ring-members or the corresponding amino acids.

Suitable starting products include aliphatic and/or aromatic dicarboxylic acids such as adipic acid, 2,2,4- and 2,4,4-trimethyladipic acid, azelaic acid, sebacic acid, isophthalic acid, terephthalic acid, aliphatic and/or aromatic diamines such as hexamethylenediamine, 1,9-nonanediamine, 2,2,4- and 2,4,4-trimethyl-hexamethylenediamine, the isomeric diaminodicyclohexylmethanes, diaminodicyclohexylpropane, bis-aminomethylcyclohexane, phenylenediamine, xylylenediamine, aminocarboxylic acids such as aminocaproic acid or the corresponding lactams. Copolyamides made from several of the monomers mentioned are included.

Caprolactams are useful, as is, ϵ-caprolactam.

Furthermore, compounds which are based mostly on polyamide-6 (PA6), polyamide 6,6 (PA66) and other aliphatic and/or aromatic polyamides and/or copolyamides in which 3 to 11 methylene groups are present on a polyamide group in the polymer chain are especially suitable.

The polyamides used may also be used as a mixture with other polyamides and/or further polymers.

In addition, the polyamide molding compositions can also contain fire retardants such as phosphorus compounds, organic halogen compounds, nitrogen compounds and/or magnesium hydroxide, stabilizers, processing aids such as lubricants, nucleating agents, stabilizers, impact resistance modifiers such as rubbers or polyolefins, provided that these do not have too strong an absorption in the region of the wavelengths of the laser used.

Suitable fibrous reinforcing agents, apart from glass fibers, are aramide fibers, mineral fibers and whiskers. Suitable mineral fillers which may be mentioned are, for example, calcium carbonate, dolomite, calcium sulfate, mica, fluorinated mica, wollastonite, talcum and kaolin. To improve the mechanical properties, the fibrous reinforcing agents and mineral fillers can be surface-treated.

Addition of the energy-absorbing inorganic additives and fillers can be performed before, during or after polymerization of the monomers to give a polyamide. If addition of the fillers takes place after polymerization, this can be performed by addition to the polyamide melt in an extruder. If addition of the fillers takes place before or during polymerization, then polymerization can include phases in which processing takes place in the presence of 1 to 50 wt. % of water.

The fillers may be present during addition as particles with the particle sizes which are ultimately present in the molding composition. Alternatively, the fillers can be added in the form of precursors from which the particles which are ultimately present in the molding composition are produced only during the course of addition or incorporation.

Suitable fire-proofing or fire-retardant agents include, for example, red phosphorus, described in DE-A-3 713 746, page 5, line 40 to page 6, line 1, and EP-A-299 444, page 14, lines 11 to 12, brominated diphenyls or diphenyl ethers in combination with antimony trioxide and chlorinated cycloaliphatic hydrocarbons (Dechlorane® plus from Occidental Chemical Co., with a density of 1.8 g/cm$^3$ and a melting point (with decomposition) of 350° C.), brominated styrene oligomers described in DE-A-2 703 419, column 4, line 8 to column 3, line 68 and o-, m- and/or p-brominated polystyrenes (e.g. Pyro-Chek 68® from Albemarle Corp., with a specific density of 2.1 g/cm$^3$, a bromine content of at least 66 wt. %, a $T_g$ of 195° C., and a melting point of 265° C.).

Zinc compounds or iron oxides, for example, are used as synergists to the halogen compounds mentioned above.

As other alternatives, melamine salts have proven especially appropriate as flame retardants, such as for non-reinforced polyamides.

In addition, magnesium hydroxide has long been recognized as a flame retardant for polyamide.

The polyamide molding compositions may contain, apart from glass fibers, additional rubber-elastic polymers, which are often also called impact resistance modifiers, elastomers or rubbers.

Partially aromatic polyesters can be used as thermoplastic materials. Partially aromatic polyesters are understood to be polyesters which contain, in addition to aromatic repeating units, also aliphatic repeating units. The polyesters can be chosen from the group consisting of derivatives of polyalkylidene terephthalates, polyethylene terephthalates, polytrimethylene terephthalates and polybutylene terephthalates. The polyesters can also be chosen from the group consisting of derivatives of polybutylene terephthalates.

Useful polyalkylene terephthalates are described in more detail in the next few paragraphs.

The polyalkylene terephthalates used are reaction products of aromatic dicarboxylic acids or their reactive derivatives such as dimethyl esters or anhydrides and aliphatic, cycloaliphatic or araliphatic diols and mixtures of these reaction products.

Preferred polyalkylene terephthalates can be prepared by known methods from terephthalic acid or its reactive derivatives and aliphatic or cycloaliphatic diols with 2 to 10 carbon atoms (Kunststoff-Handbuch, vol. VIII, page 695 et seq., Karl-Hanser-Verlag, Munich, 1973).

Preferred polyalkylene terephthalates contain at least 80, or, for example, 90 mol. %, with respect to the molar amounts of dicarboxylic acid, of terephthalates and at least 80, or, for example, at least 90 mol. %, with respect to the molar amount of diol components, of ethylene glycol and/or propanediol-1,3 and/or butanediol-1,4 groups.

Polyalkylene terephthalates useful in the present invention can contain, in addition to terephthalates, up to 20 mol. % of groups from other aromatic dicarboxylic acids with 8 to 14 carbon atoms or aliphatic dicarboxylic acids with 4 to 12 carbon atoms, such as groups from phthalic acid, isophthalic acid, naphthaline-2,6-dicarboxylic acid, 4,4'-diphenyl-dicarboxylic acid, succinic, adipic, sebacic or azelaic acid or cyclohexanediacetic acid.

Polyalkylene terephthalates can contain, in addition to ethylene glycol or propanediol-1,3 or butanediol-1,4 groups, up to 20 mol. % of other aliphatic diols with 3 to 12 carbon atoms or cycloaliphatic diols with 6 to 21 carbon atoms, such as groups from propanediol-1,3; 2-ethylpropanediol-1,3; neopentyl glycol, pentane-diol-1,5; hexanediol-1,6; cyclohexanedimethanol-1,4; 3-methylpentanediol-2,4; 2-methylpentanediol-2,4; 2,2,4-trimethylpentanediol-1,3 and -1,6; 2-ethylhexanediol-1,3; 2,2-diethyl-propanediol-1,3; hexanediol-2,5; 1,4-di-(β-hydroxyethoxy)-benzene, 2,2-bis-(4-hydroxycyclohexy)-propane, 2,4-dihydroxy-1,1,3,3-tetramethyl-cyclobutane, 2,2-bis-(3-β-hydroxyethoxyphenyl)-propane and 2,2-bis-(4-hydroxypropoxy-phenyl)-propane as described in DE-A 25 07 674, page 4, line 11 to page 4, line 16, DE-A 25 07 776, page 4, line 11 to page 4, line 16, DE-A 27 15 932, page 6, line 25 to page 9, line 12.

The polyalkylene terephthalates can be branched by incorporating relatively small amounts of 3-hydric or 4-hydric alcohols or 3-basic or 4-basic carboxylic acids, as described in DE-A 19 00 270, page 4, line 16 to page 5, line 4 and in U.S. Pat. No. 3,692,744, column 2, line 31 to column 2, line 49. Examples of preferred branching agents include trimesic acid, trimellitic acid, trimethylolethane and -propane and pentaerythritol.

It is advisable to use not more than 1 mol. % of branching agent, with respect to the acid component.

Polyalkylene terephthalates which have been prepared only from terephthalic acid and its reactive derivatives such as its dialkyl esters and ethylene glycol and/or propanediol-1,3 and/or butanediol-1,4 (polyethylene and polybutylene terephthalate) and mixtures of these polyalkylene terephthalates are useful.

Polyalkylene terephthalates also include copolyesters which are prepared from at least two of the acid components mentioned above and/or from at least two of the alcohol components mentioned above; such, copolyesters include poly-(ethylene glycol/butanediol-1,4)-terephthalates.

The polyalkylene terephthalates generally have an intrinsic viscosity of about 0.4 to 1.5, or, for example, 0.5 to 1.3, each measured in phenol/o-dichlorobenzene (1:1 parts by wt.) at 25° C.

Furthermore, the partially aromatic polyesters can contain additives such as fillers and reinforcing agents such as glass fibers or mineral fillers, flame retardants, processing aids, stabilizers, flow promoters, antistatic agents and other conventional additives.

Fibrous or particulate fillers and reinforcing substances which can be added to molding compositions according to the present invention include glass fibers, glass beads, glass fabric, glass mats, aramide fibers, potassium titanate fibers, natural fibers, amorphous silica, magnesium carbonate, barium sulfate, feldspar, mica, silicates, quartz, talcum, kaolin, wollastonite etc, which may also be surface-treated. Useful reinforcing substances are commercially available glass fibers. The glass fibers, which generally have a fiber diameter between 8 and 18 µm, may be added as infinite fibers or as cut or milled glass fibers, wherein the fibers can be provided with a suitable size system and a bonding agent or bonding agent system based on silane.

Needle-shaped mineral fillers are also suitable. A needle-shaped mineral filler is understood, in the context of the present invention, to be a mineral filler with a very pronounced needle-shaped structure. Needle-shaped wollastonite may be mentioned as an example. The mineral can have a length/diameter (L/D) ratio of 8:1 to 35:1, or, for example, 8:1 to 11:1. The mineral filler may optionally be surface-treated.

The polyester molding compositions can contain 0 to 50 parts by wt., or, for example, 0 to 40, or, further for example, 10 to 30 parts by wt. of filler and/or reinforcing substance. Polyester molding compositions without any filler or reinforcing substance can also be used.

Suitable flame retardants are commercially available organic compounds or halogen compounds with synergists or commercially available nitrogen compounds or organic/inorganic phosphorus compounds. Mineral flame retardant additives such as magnesium hydroxide or Ca—Mg carbonate hydrates, as described in DE-A 4 236 122, page 2, lines 46 to 50, can also be used. The following may be mentioned by way of example as halogen-containing, for example, brominated and chlorinated, compounds: ethylene-1,2-bis-tetrabromophthalimide, epoxidized tetrabromo-bisphenol-A resin, tetrabromobisphenol-A oligocarbonate, tetrachloro-bisphenol-A oligocarbonate, pentabromopolyacrylate, brominated polystyrene. Suitable organic phosphorus compounds include the phosphorus compounds described in WO 98/17720, page 7, line 26 to page 11, line 11, such as triphenyl phosphate (TPP), resorcinol-bis-(diphenyl phosphate), (RDP), including oligomers and bisphenol-A-bis-diphenyl phosphate (BDP) including oligomers, melamine phosphate, melamine pyrophosphate, melamine polyphosphate and mixtures of these. Suitable nitrogen compounds include melamine and melamine cyanurate. Suitable synergists are antimony compounds, such as, antimony trioxide and antimony pentoxide, zinc compounds, tin compounds such as tin stannate and borates. Carbon-producers and tetrafluoroethylene polymers may also be added.

The partially aromatic polyesters may also contain conventional additives such as agents to prevent thermal decomposition, agents to prevent thermal cross-linking, agents to prevent damage due to ultraviolet light, plasticizers, lubricants and mould release agents, nucleating agents, and optionally other stabilizers.

The partially aromatic molding compositions can be prepared by blending the particular constituents in a known manner and melt-compounding or melt-extruding at temperatures of 200° C. to 330° C. in conventional units such as internal compounders, extruders, twin-shaft screws. During the melt-compounding or melt-extruding step, other additives such as reinforcing substances, stabilizers, lubricants and mould release agents, nucleating agents and other additives can be added.

Examples of oxidation inhibitors and heat stabilizers which may be mentioned include sterically hindered phenols and/or phosphites, hydroquinones, aromatic secondary amines such as diphenylamine, various substituted representatives of these groups and mixtures of these in concentrations up to 1 wt. %, with respect to the weight of the thermoplastic molding composition.

UV stabilizers which may be mentioned, which are generally used in amounts of up to 2 wt. % with respect to the molding composition, are various substituted resorcinols, salicylates, cinnamates, benzotriazoles, hydroxyphenyltriazines and benzophenones.

Other inorganic pigments such as titanium dioxide, ultramarine blue, iron oxide and carbon black, furthermore organic pigments such as phthalocyanines, quinacridones, perylenes and dyes such as nigrosin and anthraquinone can be added as coloring agents, as well as other coloring agents as long as these do not absorb in the region of the laser used. Otherwise they should be used only in amounts small enough still to enable at least partial transmission of the laser light.

Sodium phenylphospinate, aluminum oxide, silicon dioxide, for example, and preferably talcum, can be used as nucleation agents.

Lubricants and mould release agents, which are generally used in amounts of up to 1 wt. %, are preferably ester waxes, pentaerthrityl tetrastearate (PETS), long-chain fatty acids (e.g. stearic acid or behenic acid), their salts such as Ca and/or Zn stearate and amide derivatives such as ethylene-bis-stearylamide or montana wax and low molecular weight polyethylene or polypropylene waxes.

Examples of plasticizers which may be mentioned include dioctyl phthalate, dibenzyl phthalate, butylbenzyl phthalate, high-boiling hydrocarbons (boiling point >250° C.), N-(n-butyl)benzenesulfonamide.

The additional use of rubber-elastic polymers, which are also known as impact resistance modifiers, elastomers or rubbers, is useful according to the present invention.

Rubber-elastic polymers include copolymers produced from two or more monomers such as ethylene, propylene, butadiene, isobutene, isoprene, chloroprene, vinyl acetate, styrene, acrylonitrile and acrylates or methacrylates with 1 to 18 carbon atoms in the alcohol component. Useful graft copolymers include polybutadiene, butadiene/styrene copolymers and acrylate rubbers grafted with styrene and/or acrylonitrile and/or alkyl acrylates or alkyl methacrylates.

These types of polymers are described in Houben-Weyl, Methoden der organischen Chemie, vol. 14/1 (Georg-Thieme-Verlag), Stuttgart, 1961, pages 392 to 406 and in the monograph by C. B. Bucknall, "Toughened Plastics" (Applied Science Publishers), London, 1977, pages 66 to 106.

Mixtures of the types of rubbers may also be used.

Suitable coloring agents include either organic or inorganic pigments and/or dyes. Carbon black is also an optional constituent of the pigment mixture. The pigments/dyes and/or carbon black may optionally also be used as a batch.

Inorganic pigments which may be mentioned include: lithopone, titanium dioxide (anatase, rutile), zinc oxide, zinc sulfide, metal oxides such as berlin blue, chromium oxides, iron oxides, cobalt blue, cobalt-chromium blue, cobalt-nickel grey, manganese blue, manganese violet, molybdate orange, molybdate red, nickel-antimony titanate, ultramarine blue as well as zirconium silicate, zirconium-vanadium blue, zirconium-praseodymium yellow.

Organic pigments which may be mentioned include: anthraquinone, azo, azomethine, benzanthrone, quinacridone, quinophthalone, dioxazine, flavanthrone, indanthrone, isoindoline, isoindolinone, methine, perinone, perylene, phthalocyanine, pyranthrone, pyrrolopyrrole, thioindigo pigments and metal complexes of e.g. azo, azomethine, methine dyes or metal salts of azo compounds.

Suitable polymer-soluble dyes include, for example, dispersion dyes such as those of the anthraquinone series, for example alkylamino, amino, arylamino, cyclohexylamino, hydroxy, hydroxyamino or phenylmercapto anthraquinones as well as metal complexes of azo dyes, such as, 1:2 chromium or cobalt complexes of monoazo dyes as well as fluorescent dyes, for example those made from the benzthiazole, coumarin, oxarine or thiazone series.

Polymer-soluble dyes can also be used in combination with fillers and/or pigments, for example, with inorganic pigments such as titanium dioxide.

According to the present invention, pigments and/or polymer-soluble dyes can be used.

Suitable pigment additives include, for example, fatty acids with at least 12 carbon atoms such as behenic acid or stearic acid, their amides, salts or esters such as aluminum stearate, magnesium stearate, zinc stearate or magnesium behenate, as well as quaternary ammonium compounds such as tri-($C_1$-$C_4$)-alkylbenzylammonium salts, waxes such as polyethylene wax, resin acids such as abietic acid, colophonium soaps, hydrogenated or dimerised colophonium, $C_{12}$-$C_{18}$-paraffindisulfonic acids or alkylphenols.

Also suitable are metal-containing pigments such as inorganic pigments and metal complexes of azo, azomethine or methine dyes, azomethine, quinacridone, dioxazine, isoindoline, isoindolinone, perylene, phthalocyanine, pyrrolopyrrole, and thioindigo coloring agents and bismuth vanadate.

Thermoplastic materials can be homopolymers or copolymers of ethylenically unsaturated monomers and polycondensates of bifunctional reactive compounds. Mixtures of different polymers are also suitable.

Polymers which do not contain any crystalline regions in the processed state, and thus are completely amorphous, are also suitable.

In this case, "amorphous" is understood to be the polymer state described in L. H. Sperling: Introduction to Physical Polymer Science, J. Wiley & Sons, 1986, page 123.

Examples of homopolymers and copolymers of one or more ethylenically unsaturated monomers ("vinyl polymers") are those of the monomers ethylene, propylene, vinyl acetate, styrene, α-methylstyrene, o- and/or m- and/or p-substituted styrenes, acrylonitrile, methacrylonitrile, methyl methacrylate, maleic anhydride, N-substituted maleic imides, chloroprene, butadiene-1,3, isoprene, $C_{1-15}$-alkyl acrylates and methacrylates.

For example, the following are suitable:
rubber-free vinyl polymers (A.1)
rubber-containing vinyl polymers, e.g. graft polymers of vinyl monomers on a rubber (A.2)
mixtures of rubber-free (A.1) and rubber-containing (A.2) vinyl polymers.

Useful vinyl polymers A.1 include copolymers of on the one hand styrene, α-methyl styrene, ortho- and/or meta- and/or para-substituted styrene or mixtures of these monomers (A.1.1) and on the other hand acrylonitrile, methacrylonitrile, methyl methacrylate, maleic anhydride, N-substituted maleic imide or mixtures of these monomers (A.1.2).

These copolymers can contain 50 to 98 wt. % of A.1.1 and 50 to 2 wt. % of A.1.2.

Useful copolymers A.1 include styrene, acrylonitrile and optionally methyl methacrylate, of α-methylstyrene, acrylonitrile and optionally methyl methacrylate or of styrene, α-methylstyrene, acrylonitrile and optionally methyl methacrylate.

For example, styrene/acrylonitrile copolymers, which can be prepared by radical polymerization, for example, by emulsion, suspension, solution or bulk polymerization are useful as A.1. Copolymers A.1 can have molecular weights Mw (weight average, determined by light scattering or sedimentation) of 15 000 to 200 000.

Further copolymers A.1 include randomly structured copolymers of styrene and maleic anhydride, which can be prepared from the corresponding monomers e.g. by continuous bulk or solution polymerization with incomplete conversions. The composition can vary between wide limits. They can contain 5 to 25 wt. % of repeating units derived from maleic anhydride.

These polymers may also contain o- and/or m- and/or p-substituted styrenes, such as p-methylstyrene, vinyl toluene, 2,4-dimethylstyrene and other substituted styrenes, such as α-methylstyrene, instead of styrene.

Rubber-containing vinyl polymers A.2 include e.g. graft copolymers with rubber-elastic properties which are obtainable substantially from at least two of the following monomers: chloroprene, butadiene-1,3, isoprene, styrene, acrylonitrile, ethylene, propylene, vinyl acetate, $C_1$-$C_{18}$-alkyl acrylates and $C_1$-$C_{18}$-alkyl methacrylates. Such polymers are described in "Methoden der Organischen Chemie" (Houben-Weyl), vol. 14/1, Georg Thieme-Verlag, Stuttgart, 1961, pages 393-406 and in C. B. Bucknall, "Toughened Plastics", Appl. Science Publishers, London, 1977, pages 66 to 106. Preferred polymers A.2 are partially cross-linked and have gel contents of more than 20 wt. %, or, for example, more than 40 wt. %, or further, for example, more than 60 wt. %.

Rubber-like vinyl polymers A.2 include graft copolymers of:
A.2.1 5 to 95, preferably 30 to 80 parts by wt. of a mixture of
A.2.1.1 50 to 95 parts by wt. of styrene, α-methylstyrene, ortho-, meta- and/or para- or halogenostyrene, or ortho-, meta- and/or para-methylstyrenes, methyl methacrylate or mixtures of these compounds and
A.2.1.2 5 to 50 parts by wt. of acrylonitrile, methacrylonitrile, methyl methacrylate, maleic anhydride, $C_1$-$C_4$-alkyl or phenyl-N-substituted maleic imides or mixtures of these compounds on
A.2.2 5 to 95, preferably 20 to 70 parts by wt. of rubber polymer with a glass transition temperature below −10° C.

Graft copolymers A.2 include, eg. polybutadiene, butadiene/styrene copolymers and acrylate rubbers grafted with styrene and/or acrylonitrile and/or alkyl acrylates or alkyl methacrylates; and also copolymers of the type described in DE-A 1 694 173, page 2, line 32 to page 4, line 10; polybutadienes, butadiene/styrene or butadiene/acrylonitrile copolymers, polyisobutenes or polyisoprenes grafted with alkyl acrylates or methacrylates, vinyl acetate, acrylonitrile, styrene and/or alkylstyrenes, as described in DE-A 2 348 377, page 4, line 14 to page 5, line 2.

Polymers A.2 include ABS polymers as described in DE-A 2 035 390, page 2, line 15 to page 3, line 6 and in DE-A 2 248 242, page 11, line 3 to page 13, line 17.

Graft copolymers A.2 can be obtained by the graft polymerization of
α. 10 to 70, or, 15 to 50, of, for example, 20 to 40 wt. % (with respect to graft copolymer A.2) of acrylates or methacrylates or of 10 to 70, or, 15 to 50, of, for example, 20 to 40 wt. % of a mixture of 10 to 50, or, 20 to 35 wt. % (with respect to the mixture of acrylonitrile, acrylate, or methacrylate and styrene) of acrylonitrile, acrylates or methacrylates and 50 to 90, or, for example, 65 to 80 wt. % (with respect to the mixture of acrylonitrile, acrylate, or methacrylate and styrene) of styrene (as graft covering A.2.1) on
β. 30 to 90, or, 50 to 85, or, for example, 60 to 80 wt. %, with respect to graft polymer A.2, of a butadiene polymer containing at least 50 wt. %, with respect to β, of butadiene groups (as graft substrate A.2.2), wherein the gel content of graft substrate β is at least 40 wt. % (measured in toluene), the degree of grafting G is 0.15 to 0.55 and the average particle diameter $d_{50}$ of graft polymer A.2 is 0.05 to 2 μm, or, for example, 0.1 to 0.6 μm.

Acrylates and methacrylates α are esters of acrylic acid or methacrylic acid and monohydric alcohols with 1 to 18 carbon atoms. Methyl methacrylate, ethyl methacrylate, propyl methacrylate, n-butyl acrylate, t-butyl acrylate and t-butyl methacrylate are particularly preferred.

The butadiene polymer β can contain, apart from butadiene groups, up to 50 wt. %, with respect to β, of groups from other ethylenically unsaturated monomers such as styrene, acrylonitrile, $C_1$-$C_4$-alkyl esters of acrylic or methacrylic acid (such as methyl acrylate, ethyl acrylate, methyl methacrylate, ethyl methacrylate) vinyl esters and/or vinyl ethers. For example, β can contain polybutadiene.

During graft polymerization the graft monomers, as is known, do not polymerize fully on the graft substrate; however, graft polymer A.2 includes products which have been obtained by graft polymerization in the presence of the graft substrate.

The degree of grafting G is the ratio by weight of grafted-on graft monomers to graft substrate (a dimensionless number).

The average particle diameter $d_{50}$ is the diameter above and below which lie 50% each of the particles. It can be determined by means of ultracentrifuge measurement (W. Scholtan, H. Lange, Kolloid, Z. und Z. Polymere 250 (1972), pages 782 to 796).

Further particularly preferred polymers A.2 are graft copolymers made from
τ. 20 to 90 wt. %, with respect to A.2, of acrylate rubber with a glass transition temperature below −20° C., as graft substrate A.2.2, and
ε. 10 to 80 wt. %, with respect to A.2, of at least one polymerizable ethylenically unsaturated monomer, the homopolymer or copolymer(s) of which, produced in the absence of τ, have a glass transition temperature above 25° C., as graft monomer A.2.1.

The acrylate rubbers τ in polymer A.2 include polymers of alkyl acrylates, optionally with up to 40 wt. %, with respect to τ, of other polymerizable, ethylenically unsaturated monomers. Included among the polymerizable esters of acrylic acid are $C_1$-$C_8$-alkyl esters, for example methyl, ethyl, butyl, n-octyl and 2-ethylhexyl esters; halogenoalkyl esters, preferably halogeno-$C_1$-$C_8$-alkyl esters such as chloroethyl acrylate, and mixtures of these monomers.

For cross-linking purposes, monomers with more than one polymerizable double bond can be copolymerized. Examples of cross-linking monomers include esters of unsaturated monocarboxylic acids with 3 to 8 carbon atoms and unsaturated monohydric alcohols with 3 to 12 carbon atoms or saturated polyols with 2 to 4 OH groups and 2 to 20 carbon atoms, such as ethylene glycol dimethacrylate, allyl methacrylate; polyunsaturated heterocyclic compounds such as trivinyl and triallyl cyanurate; polyfunctional vinyl compounds such as di- and trivinylbenzenes; but also trially phosphate and diallyl phthalate.

Cross-linking monomers include allyl methacrylate, ethylene glycol dimethacrylate, diallyl phthalate and heterocyclic compounds which contain at least 3 ethylenically unsaturated groups.

Cross-linking monomers include the cyclic monomers triallyl cyanurate, triallyl isocyanurate, trivinyl cyanurate, triacryloylhexahydrotriazine, triallylbenzene.

The amount of cross-linking monomers can be 0.02 to 5, or, for example, 0.05 to 2 wt. %, with respect to graft substrate τ.

In the case of cyclic cross-linking monomers with at least 3 ethylenically unsaturated groups, it is possible to restrict the amount to less than 1 wt. % of graft substrate τ.

"Other" polymerizable ethylenically unsaturated monomers which optionally can be used to prepare the graft substrate, apart from esters of acrylic acid, are acrylonitrile, styrene, α-methylstyrene, acrylamide, vinyl-$C_1$-$C_6$-alkyl ethers, methyl methacrylate, butadiene. Acrylate rubbers for use as graft substrate τ are emulsion polymers which have a gel content of at least 60 wt. %.

Other suitable graft substrates in accordance with A.2.2 are silicone rubbers with graft-active sites like those described in DE-A 37 04 657, column 5, line 21 to column 6, line 52; DE-A 37 04 655, column 5, line 24 to column 6, line 65; DE-A 36 31 540, page 6, line 65 to page 7, line 45; and DE-A 36 31 539, page 6, line 54 to page 7, line 35.

The gel content of the graft substrate A.2.2 is determined at 25° C. in dimethylformamide (M. Hoffmann, H. Krömer, R. Kuhn, Polymeranalytik I and II, Georg Thieme-Verlag, Stuttgart, 1977).

Graft polymers A.2 can be prepared by known processes such as bulk, suspension, emulsion or bulk-suspension processes.

The mixture according to the present invention can also be incorporated into polyurethanes using methods known to a person skilled in the art. Polyurethanes are understood to be polymers which are obtained by the addition reaction of polyisocyanates with compounds which can react with isocyanates. Compounds which can react with isocyanates are understood to be compounds which contain at least 2 hydroxyl and/or amino groups bonded to an organic group.

Suitable organic diisocyanates are, for example, aliphatic, cycloaliphatic, araliphatic, heterocyclic and aromatic diisocyanates, such as are described in Justus Liebigs Annalen der Chemie, 562, p. 75-136. Aromatic and cycloaliphatic diisocyanates are useful.

The following may be mentioned, by way of example: aliphatic diisocyanates such as hexamethylene diisocyanate, cycloaliphatic diisocyanates such as isophorone diisocyanate, 1,4-cyclohexane diisocyanate, 1-methyl-2,4-cyclohexane diisocyanate, and 1-methyl-2,6-cyclohexane diisocyanate as well as the corresponding isomer mixtures, 4,4'-dicyclohexylmethane diisocyanate, 2,4'-dicyclohexylmethane diisocyanate and 2,2'-dicyclohexylmethane diisocyanate and the corresponding isomer mixtures, aromatic diisocyanates such as 2,4-toluoylene diisocyanate, mixtures of 2,4-toluoylene diisocyanate and 2,6-toluoylene diisocyanate, 4,4'-diphenylmethane diisocyanate 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanato-diphenylethane-1,2 and 1,5-naphthylene diisocyanate. 1,6-hexamethylene diisocyanate, isophorone diisocyanate, dicyclohexylmethane diisocyanate, diphenylmethane diisocyanate isomer mixtures with a 4,4'-diphenylmethane diisocyanate content of >96 wt. % are preferably used and in particular 4,4'-diphenylmethane diisocyanate and 1,5-naphthylene diisocyanate. The diisocyanates mentioned may be used individually or in the form of mixtures with each other. They may be used with up to 15 wt. % (calculated with respect to the total amount of diisocyanate) of a polyisocyanate such as triphenylmethane-4,4',4''-triisocyanate or polyphenyl-polymethylene-polyisocyanates.

Useful, isocyanates include 1,6-hexamethylene diisocyanate, isophorone diisocyanate, dicyclohexylmethane diisocyanate, diphenylmethane diisocyanate isomer mixtures with a 4,4'-diphenylmethane diisocyanate content of >96 wt. % and in particular 4,4'-diphenylmethane diisocyanate and 1,5-naphthylene diisocyanate. Compounds which react with isocyanates include linear hydroxyl-terminated polyols with an average molecular weight Mn of 500 to 10000, or, 500 to 5000, or, for example, 600 to 2000. These frequently contain up to 1 wt. % of non-linear compounds as a result of the method of production. Therefore reference is often made to "substantially linear polyols". Polyetherdiols, polycarbonatediols, sterically hindered polyester diols, hydroxyl-terminated polybutadienes or mixtures of these are useful in the present invention.

Suitable polyetherdiols can be prepared by reacting one or more alkylene oxides with 2 to 4 carbon atoms in the alkylene group with a starter molecule which contains two bonded active hydrogen atoms. The following may be mentioned as alkylene oxides: ethylene oxide, 1,2-propylene oxide, epichlorohydrin and 1,2-butylene oxide and 2,3-butylene oxide. Ethylene oxide and 1,2-propylene oxide and mixtures of 1,2-propylene oxide and ethylene oxide can, for example, be used.

The alkylene oxides can be used individually, alternately or as mixtures. Suitable starter molecules are, for example: water, aminoalcohols such as N-alkyldiethanolamines, for example N-methyldiethanolamine, and diols such as ethylene glycol, 1,3-propylene glycol, 1,4-butanediol and 1,6-hexanediol. Optionally, mixtures of starter molecules may also be used.

Suitable polyetherdiols include the hydroxyl group-containing polymerization products of tetrahydrofuran. Trifunctional polyethers can also be used in proportions of 0 to 30 wt. %, with respect to the bifunctional polyethers, but at most in such an amount that a thermoplastically processable product is produced. The substantially linear polyetherdiols may be used either individually or in the form of mixtures with each other.

Suitable polyester diols can be prepared, for example, from dicarboxylic acids with 2 to 12 carbon atoms, preferably 4 to 6 carbon atoms and polyhydric alcohols. Suitable dicarboxylic acids are, for example: aliphatic dicarboxylic acids such as succinic acid, glutaric acid, adipic acid, suberic acid, azelaic acid and sebacic acid and aromatic dicarboxylic acids such as phthalic acid, isophthalic acid and terephthalic acid. The dicarboxylic acids can be used individually or in the form of mixtures, such as in the form of a succinic, glutaric and adipic acid mixture. To prepare the polyesterdiols, it may optionally be advantageous to use, instead of dicarboxylic acids, the corresponding dicarboxylic acid derivatives such as dicarboxylates with 1 to 4 carbon atoms in the alcohol group, carboxylic anhydrides or carboxylic chlorides. Examples of polyhydric alcohols are glycols with 2 to 10, or, for example, 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the properties desired, the polyhydric alcohols may be used on their own or optionally as a mixture with each other. Furthermore, esters of carbonic acid with the diols mentioned, in particular those with 4 to 6 carbon atoms, such as 1,4-butanediol or 1,6-hexanediol, condensation products of hydroxycarboxylic acids such as hydroxycaproic acid and polymerization products of lactones, optionally substituted caprolactones are also suitable. The following are useful as polyesterdiols: ethanediol-polyadipate, 1,4-butanediol-polyadipate, ethanediol-1,4-butanediol-polyadipate, 1,6-hexanediol-neopentylglycol-polyadipate, 1,6-hexanediol-1,4-butanediol-polyadipate and polycaprolactones. The polyesterdiols may be used individually or in the form of mixtures with each other.

A summary of the principle of preparation, the starting materials, the catalysis of urethane formation, the additives used, the various types and forms of application, the various methods of preparation and the areas of use is given in Ullmann's Encyclopedia of Industrial Chemistry, Wiley-VCH Verlagsgesellschaft mbH, D-69451 Weinheim, 1992, vol. A21, p. 665-716. The polyurethanes which can be prepared by this process may contain the fillers and additives known to a person skilled in the art such as antioxidants, UV stabilizers, auxiliary substances and additives, as described in DE-A 29 01 774, page 14, line 16 to page 15, line 2, such as Ionol, Irganox® 1076, Irganox® 1098, Tinuvin® 144, Irgafos® 38, Höchstwachs® C, Acrawax® or Loxamid®. The following may also be mentioned: lubricants such as esters of fatty acids, their metal soaps, fatty acid amides and silicone compounds, antiblocking agents, inhibitors, stabilizers against hydrolysis, heat and discoloration, flame retardants, colorants, pigments, inorganic and organic fillers and reinforcing agents.

Further advantages of the mixture according to the present invention, the method of preparation of same and the polymeric radiation protection substances which are prepared from the mixture according to the present invention and the polymers are: less weight, toxicological acceptability, freedom from heavy metals in the radiation protection additive, environmentally friendly waste disposal after use, long service life, lower wear and tear due to high mechanical properties, sterilizability by hot steam.

The polymeric radiation protection substances according to the invention described here, in which either polyurethanes, thermoplastic materials or rubbers can be used as the polymer, can be used to screen electromagnetic radiation from television or monitor housings. They can be used as the starting material for radiation-protected items of clothing such as aprons, jackets, waistcoats, trousers, gloves, or for the protection of thyroid glands, ovaries and gonads. Furthermore they can be used on the walls of rooms in the form of rubber or plastic mats or on floorings in the form of rubber floor coverings (combining damping the sound of footsteps with a screening effect). The mixtures according to the present invention can be admixed as a powder to cement or concrete mixtures to prepare building bricks, concrete or tiles. They can also be used in polyurethane foams for heat insulation. Films, foils and containers, which can be used as casings or packaging for photographic films to protect the contents from exposure to X-radiation, can be prepared from polymeric radiation protection substances filled with the mixture according to the present invention.

EXAMPLES

General

Unless stated otherwise, all amounts of components and compounds are to be understood as given with reference to weight, calculated to the amount of all elements.

To determine the screening effect, the mixtures according to the present invention were used in a thickness which provides protection from electromagnetic radiation with energies greater than 10 keV, with attenuation factors which correspond to a layer of metallic lead with a thickness of at least 0.1 mm to 1.0 mm. This equivalent is measured in the same way that lead equivalents were determined, in accordance with the prior art according to DIN 6845, by using X-radiation at different tube potentials (X-ray tube with a tungsten anticathode), typically at 75 kV, 100 kV, 150 kV or 300 kV with defined beam geometries and defined beam qualities.

In a second process, step wedges were made by gluing plates on top of each other. Areas of different thickness are produced, thus each providing different bulk coverings by the mixture according to the present invention. The step wedges were exposed to X-radiation with different tube potentials and the exposed X-ray films are evaluated densitometrically. The same degree of blackening indicates the same degree of absorption of the radiation. Less blackening indicates a better screening effect.

In the examples, the particular process used to determine the screening characteristics is described.

In order to relate the results of the irradiation tests to a quantity which is independent of the sample density and the degree of filling by the radiation protection additive, the bulk covering is defined as follows:

Bulk covering=density of the sample [g/cm$^3$]×degree of filling by the polymeric radiation protection substance [%]×thickness of the sample [cm]/100

Example 1 a) Raw Materials Used and their Composition

A mixture according to the invention was prepared from the following components:

| Name | Manufacturer | Proportion in the mixture according to the present invention |
| --- | --- | --- |
| Optipol polishing powder | Tschepetsk Mechanisches Werk AG, Glasow | 29.5 wt. % |
| Gadolinium concentrate | "Moscow Polymetal Works", government business enterprise, Moscow | 39.0% |
| Tungsten powder 6.1 | "Kirov Works for Hard Alloys", Swerdlower District | 31.5% | b) Composition According to Manufacturer's Data

| Name | Conc. of rare earths | $La_2O_3$ | $CeO_2$ | $Pr_6O_{11}$ | $Nd_2O_3$ | $Sm_2O_3$ | $Eu_2O_3$ | $Gd_2O_3$ | $Tb_2O_3$ | $Dy_2O_3$ |
|---|---|---|---|---|---|---|---|---|---|---|
| Gadolinium conc. | 97.1 | — | — | — | — | 0.9 | 0.8 | 93.8 | <0.3 | 0.5 |
| Optipol | 96.0 | 24.1 | 54.5 | 4.0 | 14.5 | 0.8 | 0.2 | <0.1 | <0.3 | — | c) Preparation of the Mixture According to the Present Invention

Before use, the Optipol polishing powder, gadolinium concentrate and tungsten powder were dried at a temperature of 120° C. for two hours and classified through sieve 063 (tungsten through sieve 016). Then the three components were mixed in a tumble mixer for 24 hours.

An orange-brown, free flowing, lump-free powder with a density of 8.55 g/cm³ was obtained as the mixture according to the present invention. The density was measured by a pycnometric method with isopropanol, ethanol and acetone as the measuring liquid.

Example 2

Commercially available aromatic thermoplastic polyurethane (TPU), softening point about 160° C., processing temperature about 200° C., density 1.2 g/cm³.

Samples 1 to 5 were prepared from the polyurethane and the mixture according to the present invention from example 1 by calandering: the rollers on a calander were preheated to slightly above the melting point, i.e. to about 170° C. The TPU was applied to the preheated rollers and homogenized on the revolving rollers after melting. Then the mixture according to the invention from example 1 was added in portions. The material was compounded until it was externally homogeneous. It was established, from X-ray tests on the homogeneity of the TPU/additive mixtures, that about 1 hour compounding time on the rollers was required.

Then the compounds were introduced into a mould coated with silicone spray as a separating agent. The filled mould was heated to 170° C. to 180° C. processing temperature in a hydraulic press with electric heating. The temperature was held constant for 15 minutes and then a pressure of 150 bar was applied. On cooling to room temperature the pressure was increased to 350 bar. The disc-like molded items had a diameter of 50 mm and a depth of 0.85 to 0.9 mm; they were removed after reducing the pressure to atmospheric and their density was determined.

Samples of the mixture according to the present invention and the TPU were prepared using the process described above:

| Name | Additive conc. [$k_A$] | Density [$\rho_p$] | Thickness [$d_p$] | Bulk covering [$m_A$] |
|---|---|---|---|---|
| Sample 1 | 14.7 wt. % | 1.38 g/cm³ | 3.29 mm | 0.067 g/cm² |
| Sample 2 | 17.7 wt. % | 1.42 g/cm³ | 6.23 mm | 0.157 g/cm² |
| Sample 3 | 57.2 wt. % | 2.36 g/cm³ | 1.78 mm | 0.240 g/cm² |
| Sample 4 | 75.7 wt. % | 3.4 g/cm³ | 0.99 mm | 0.255 g/cm² |
| Sample 5 | 84.0 wt. % | 4.26 g/cm³ | 1.12 mm | 0.401 g/cm² |

$m_A = k_A \cdot \rho_p \cdot d_p$
Bulk covering = proportion by weight of mixture according to the invention × density of the sample × thickness of the sample Example 3

Testing the X-Ray Protection Characteristics

The screening characteristics of sample 1 to sample 5 were measured in the geometry of the narrow beam cluster in accordance with DIN 6845 using tungsten X-ray tubes with defined beam quality. The beam quality of the ISO spectrum H-100 was achieved by total flittering with Al and Cu filters. The degree of attenuation and the lead equivalents of the samples were determined.

Beam quality ISO-H-100 was achieved by: accelerating voltage U=100 kV and filter: 4 mm Al+0.11 mm Cu.

| | U = 100 kV, 4 mm Al + 0.11 mm Cu | | |
|---|---|---|---|
| Name | Bulk covering [$m_A$] | Degree of attenuation | Lead equivalent mm Pb |
| Sample 1 | 0.067 g/cm² | 1.94 | 0.06 mm |
| Sample 2 | 0.157 g/cm² | 3.92 | 0.17 mm |
| Sample 3 | 0.240 g/cm² | 6.97 | 0.28 mm |
| Sample 4 | 0.255 g/cm² | 7.05 | 0.28 mm |
| Sample 5 | 0.401 g/cm² | 17.8 | 0.5 mm |

The lead samples used for calibration and comparison measurements had a diameter of 50 mm. They were cut from lead foils of grade S1 with a thickness of 0.065 mm and 0.085 mm. The test region covered lead equivalents from 0.1 to 0.5 mm. The thickness of the lead samples introduced was determined by a weighing procedure, using the total weight, sample area and the specific density of lead of 11.3 g/cm³.

| Name | Bulk covering [$m_A$] | Degree of attenuation | Lead equivalent mm Pb |
|---|---|---|---|
| Sample 6 (lead comparison) | 0.135 g/cm² | 2.5 | 0.11 mm |
| Sample 7 (lead comparison) | 0.28 g/cm² | 5.8 | 0.24 mm |
| Sample 8 (lead comparison | 0.4 g/cm² | 9.5 | 0.34 mm |
| Sample 9 (lead comparison) | 0.465 g/cm² | 12.5 | 0.43 mm |
| Sample 10 (lead comparison) | 0.59 g/cm² | 19 | 0.52 mm |

For the same bulk covering of 0.4 g/cm², the degree of attenuation of sample 5, was 17.8, whereas the lead comparison (sample 8) had a degree of attenuation of only 9.5. That means that, for the same radiation protection effect as lead, a lower bulk covering is required, which can be achieved by a smaller thickness or a lower degree of filling of the sample. This leads to a weight saving and thus to increased wearer comfort for the items produced therefrom, such as e.g. X-ray aprons.

Comparison Example 4 a) Raw Materials Used and their Composition

The mixture was prepared from the following components:

| Bismuth oxide | Batch 161 | 57.0 wt. % |
| Tungsten powder 6.1 | Batch 68 | 43 wt. % | b) Composition According to the Manufacturer's Data

| Name | Concentration of |
| --- | --- |
| Bismuth oxide | 97.1 wt. % |
| Tungsten powder 6.1 | 99.9 wt. % | c) Preparation of this Mixture According to Example 4

Before use, the bismuth oxide and tungsten powder were dried for 2 hours at a temperature of 120° C. and classified through sieve 063 (tungsten through sieve 016). Then the components were mixed for 24 hours in a tumble mixer.

An orange-brown, free-flowing, lump-free powder with a density of 11.8 g/cm$^3$ was obtained, measured using a pycnometric method with isopropanol, ethanol and acetone as the measuring liquid.

Example 5

Commercially available acrylonitrile-butadiene-styrene block copolymer (ABS), softening point about 200° C., processing temperature about 220° C., density 1.05 g/cm$^3$.

The mixture from example 4 was incorporated into the ABS plastics material by calandering: the rollers on a calander were preheated to about 180° C. The ABS was applied to the preheated rollers and homogenized on the revolving rollers after melting. Then the mixture (example 4) was added in portions. The material was compounded until it was externally homogeneous. It was established, from X-ray tests on the homogeneity of the ABS/example 4 mixture, that about 1 hour compounding time on the rollers was required.

Then the compounds were introduced into a mould coated with silicone spray as a separating agent. The filled mould was heated to 190° C. to 200° C. processing temperature in a hydraulic press with electric heating. The temperature was held constant for 15 minutes and then a pressure of 150 bar was applied. On cooling to room temperature the pressure was increased to 350 bar. The disc-like molded items had a diameter of 50 mm and a depth of 0.85 to 6.5 mm; they were removed after reducing the pressure to atmospheric and their density was determined.

Samples of the mixture according to example 4 and the ABS were prepared using the process described above:

| Name | Additive conc. [k$_A$] | Density [ρ$_p$] | Thickness [d$_p$] | Bulk covering [m$_A$] |
| --- | --- | --- | --- | --- |
| Sample 11 | 16.1 wt. % | 1.215 g/cm$^3$ | 6.45 mm | 0.126 g/cm$^2$ |
| Sample 12 | 30.7 wt. % | 1.441 g/cm$^3$ | 6.46 mm | 0.286 g/cm$^2$ |
| Sample 13 | 40.3 wt. % | 1.64 g/cm$^3$ | 6.55 mm | 0.433 g/cm$^2$ |
| Sample 114 | 65.4 wt. % | 2.572 g/cm$^3$ | 2.05 mm | 0.345 g/cm$^2$ |
| Sample 15 | 84.3 wt. % | 4.488 g/cm$^3$ | 1.46 mm | 0.552 g/cm$^2$ |

$m_A = k_A \cdot \rho_p \cdot d_p$
Bulk covering = proportion by weight of mixture according to example 4 in the sample × density of the sample × thickness of the sample Example 6

Testing the X-Ray Protection Characteristics

The screening characteristics of samples 11 to sample 15 were measured in the geometry of the narrow beam cluster in accordance with DIN 6845 using tungsten X-ray tubes with defined beam quality. The beam quality of the ISO spectrum H-300 was achieved by total filtering with a Cu filter. The degree of attenuation and the lead equivalents of the samples were determined.

Beam quality ISO-H-300 was achieved by: accelerating voltage U=300 kV and filter: 2.5 mm Cu.

| | U = 300 kV, 2.5 mm Cu | | |
| --- | --- | --- | --- |
| Name | Bulk covering [m$_A$] | Degree of attenuation | Lead equivalent mm Pb |
| Sample 11 | 0.126 g/cm$^2$ | 1.38 | 0.152 mm |
| Sample 12 | 0.286 g/cm$^2$ | 1.76 | 0.285 mm |
| Sample 13 | 0.433 g/cm$^2$ | 2.15 | 0.407 mm |
| Sample 14 | 0.345 g/cm$^2$ | 1.81 | 0.299 mm |
| Sample 15 | 0.552 g/cm$^2$ | 2.3 | 0.449 mm |

The lead samples used for calibration and comparison measurements had a diameter of 50 mm. They were cut from lead foils of grade S1 with a thickness of 0.065 mm and 0.085 mm. The test region covered lead equivalents from 0.1 to 0.5 mm. The thickness of the lead samples introduced was determined by a weighing procedure, using the total weight, sample area and the specific density of lead of 11.3 g/cm$^3$.

| Name | Bulk covering [m$_A$] | Degree of attenuation | Lead equivalent mm Pb |
| --- | --- | --- | --- |
| Sample 16 (lead comparison) | 0.12 g/cm$^2$ | 1.24 | 0.10 mm |
| Sample 17 (lead comparison) | 0.2 g/cm$^2$ | 1.43 | 0.17 mm |
| Sample 18 (lead comparison | 0.25 g/cm$^2$ | 1.57 | 0.22 mm |
| Sample 19 (lead comparison) | 0.36 g/cm$^2$ | 1.87 | 0.32 mm |

For the same bulk covering, the degree of attenuation in the region between 0.1 and 0.5 mm lead equivalents in the narrow beam cluster for sample 11 to sample 15 according to the invention is higher than lead. The samples according to the invention screen the radiation better, so for the same screening effect a lighter or thinner component can be produced.

Although this mixture not according to the invention is better than lead at the accelerating voltage of 100 kV relevant for X-ray diagnostics, they are much poorer than mixtures according to the invention.

Example 7

A mixture according to the present invention was prepared from rare earth and tungsten powder in accordance with example 1, the composition being as follows:

| Rare earths | Proportion in the mixture |
|---|---|
| $La_2O_3$ | 7.0% |
| $CeO_2$ | 14.7% |
| $Nd_2O_3$ | 3.8% |
| $Gd_2O_3$ | 44.4% |
| $Pr_6O_{11}$ | 1.4% |
| $Eu_2O_3$ | 0.3% |
| $Sm_2O_3$ | 0.6% |
| $Y_2O_3$ | 0.05% |
| W | 27.3% |

Before use, the rare earths and tungsten powder were dried for 2 hours at a temperature of 120° C. and classified through sieve 063 (tungsten through sieve 016). Then the three components were mixed for 2 hours in a tumble mixer.

An orange-brown, free-flowing, lump-free powder with a density of 8.55 g/cm³ was obtained as a mixture according to the invention. The density was measured using a pycnometric method with isopropanol, ethanol and acetone as the measuring liquid.

Example 8

66.1 wt. % of the previously prepared mixture according to the present invention (from example 7) are added in 2-3 portions to 27.5 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 2.8 wt. % of Regale SRF carbon black from Cabot, 0.8 wt. % of Rhenogran® P-50 anti-hydrolysis agent from Rhein-Chemie, polycarbodiimide, 0.4 wt. % of Rhenofit® DDA styrenated diphenylamine from Rhein-Chemie, 0.3 wt. % of stearic acid, 1.0 wt. % of Rhenofit® TAC triallyl cyanurate from Rhein-Chemie and 1.1 wt. % of Polydispersion® T α,α'-bis-(tert-butylperoxy)-diisopropylbenzene, peroxide cross-linker from Rhein-Chemie. After renewed homogenization, the mixture could be drawn out as a sheet on a roller or calandered. Production of the radiation-absorbing articles was achieved after pressure forming or calandering by vulcanizing at temperatures between 150° C. and 170° C. and was completed in 30 minutes.

Samples of the mixture according to the present invention from example 7 and the rubber were prepared by the process described above:

| Name | Additive content [$k_A$] | Density [$\rho_P$] |
|---|---|---|
| Sample 20 | 66.1 wt. % | 2.554 g/cm³ |

| Name | Thickness [$d_p$] | Bulk covering [$m_A$] |
|---|---|---|
| Sample 20 | 2 mm | 0.34 g/cm² |
| Sample 21 | 4 mm | 0.68 g/cm² |
| Sample 22 | 6 mm | 1.01 g/cm² |
| Sample 23 | 8 mm | 1.35 g/cm² |
| Sample 24 | 10 mm | 1.69 g/cm² |

$m_A = k_A \cdot \rho_p \cdot d_p$

Bulk covering = proportion by weight of mixture in the sample × density of the sample × thickness of the sample

Example 9

Testing the Radiation Protection Properties

Step wedges were produced from the 20 cm×20 cm×2 mm rubber sheets by gluing them together. Areas with 2, 4, 6, 8 and 10 mm thickness were produced. The step wedges were exposed to X-radiation of beam quality U=100 kV, eff. filtering 2.5 mm Al, tungsten direct current X-ray tube for 960 s and the X-ray film was evaluated densitometrically. In the following, the results of this exposure of step wedges made from the radiation-absorbing materials in this invention are given, and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 20 | 2 mm | 0.34 g/cm² | 6.48 |
| Sample 21 | 4 mm | 0.68 g/cm² | 1.98 |
| Sample 22 | 6 mm | 1.01 g/cm² | 0.47 |
| Sample 23 | 8 mm | 1.35 g/cm² | 0.24 |
| Sample 24 | 10 mm | 1.69 g/cm² | 0.21 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) |
|---|---|---|---|
| Sample 25 (lead comparison) | 0.1 mm | 0.11 g/cm² | 6.50 |
| Sample 26 (lead comparison) | 0.2 mm | 0.23 g/cm² | 6.50 |
| Sample 27 (lead comparison) | 0.3 mm | 0.34 g/cm² | 6.50 |
| Sample 28 (lead comparison) | 0.4 mm | 0.45 g/cm² | 6.50 |
| Sample 29 (lead comparison) | 0.5 mm | 0.56 g/cm² | 5.18 |
| Sample 30 (lead comparison) | 0.6 mm | 0.68 g/cm² | 3.75 |
| Sample 31 (lead comparison) | 0.7 mm | 0.80 g/cm² | 2.82 |
| Sample 32 (lead comparison) | 0.8 mm | 0.91 g/cm² | 2.11 |
| Sample 33 (lead comparison) | 0.9 mm | 1.03 g/cm² | 1.61 |
| Sample 34 (lead comparison) | 1.0 mm | 1.14 g/cm² | 1.29 |

For the same bulk covering of 0.5 g/cm², the degree of blackening for sample 21 was 1.98, whereas the comparison sample (sample 29 (lead comparison)) allowed much more radiation to pass through and had a degree of blackening of 5.1. Less blackening indicates a better screening effect. That means that, for the same radiation protection effect as lead, a smaller bulk covering is required, which can be achieved by a smaller thickness or a lower degree of filling by the samples. This leads to a weight saving and thus to increased wearer comfort for the items produced therefrom such as e.g. X-ray aprons.

Example 10

Mechanical Data

The mechanical strength of the rubber sheets produced in example 8 was tested. The following mechanical test data were determined:

| | |
|---|---|
| Tear strength (DIN 53504/ISO 37-1977): | >10 MPa |
| Elongation at break (DIN 53504/ISO 37-1977): | >250% |
| Modulus 200% (DIN 53504/ISO 37-1977): | 7 MPa |
| Hardness (DIN 53505/ISO 868-1985): | 63 Shore A |

Example 11

A mixture according to the present invention was prepared from rare earths and tungsten powder. It had the following composition:

| Rare earths | Proportion in the mixture |
|---|---|
| $La_2O_3$ | 6.88% |
| $CeO_2$ | 13.37% |
| $Nd_2O_3$ | 3.66% |
| $Gd_2O_3$ | 47.34% |
| $Pr_6O_{11}$ | 1.24% |
| $Eu_2O_3$ | 0.07% |
| $Sm_2O_3$ | 0.40% |
| $Y_2O_3$ | 0.04% |
| W | 27.00% |

Before use, the rare earths and tungsten powder were dried for 2 hours at a temperature of 120° C. and classified through sieve 063 (tungsten through sieve 016). Then the three components were mixed for 2 hours in a tumble mixer.

Example 12

66.1 wt. % of the previously prepared mixture according to the invention from example 11 are added in 2-3 portions to 27.5 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 2.8 wt. % of Regal® SRF carbon black from Cabot, 0.8 wt. % of Rhenogran® P-50 anti-hydrolysis agent from Rhein-Chemie, polycarbodiimide, 0.4 wt. % of Rhenofit® DDA styrenated diphenylamine from Rhein-Chemie, 0.3 wt. % of stearic acid, 1.0 wt. % of Rhenofit® TAC triallyl cyanurate from Rhein-Chemie and 1.1 wt. % of Polydispersion® T α,α'-bis-(tert-butylperoxy)-diisopropylbenzene, peroxide cross-linker from Rhein-Chemie. After renewed homogenization, the mixture could be drawn out as a sheet on a roller or calandered. Production of the radiation-absorbing articles was achieved after pressure forming or calandering by vulcanizing at temperatures between 150° C. and 170° C. and was completed in 30 minutes.

Samples of the mixture according to the present invention from example 11 and the rubber were prepared by the process described above:

| Name | Additive content [$k_A$] | Density [$\rho_p$] |
|---|---|---|
| Sample 35 | 66.1 wt. % | 2.553 g/cm³ |

| Name | Thickness [$d_p$] | Bulk covering [$m_A$] |
|---|---|---|
| Sample 35 | 2 mm | 0.34 g/cm² |
| Sample 36 | 4 mm | 0.68 g/cm² |
| Sample 37 | 6 mm | 1.01 g/cm² |
| Sample 38 | 8 mm | 1.35 g/cm² |
| Sample 39 | 10 mm | 1.69 g/cm² |

$m_A = k_A \cdot \rho_p \cdot d_p$

Bulk covering = proportion by weight of mixture in the sample x density of the sample x thickness of the sample

Example 13

Testing the Radiation Protection Properties at U=75 kV, 100 kV and 150 kV

Step wedges were produced from the 20 cm×20 cm×2 mm rubber sheets by gluing them together. Areas with 2, 4, 6, 8 and 10 mm thickness were produced. The step wedges were exposed to X-radiation of beam quality U=75 kV, 100 kV or 150 kV, eff. filtering 2.5 mm Al, tungsten direct current X-ray tube for 480 s, 960 s or 240 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| | | | Blackening (relative units) | | |
|---|---|---|---|---|---|
| Name | Thickness [$d_p$] | Bulk covering [$m_A$] | 75 kV 480 sec | 100 kV 960 sec | 150 kV 240 sec |
| Sample 35 | 2 mm | 0.34 g/cm² | 2.02 | 6.45 | 6.50 |
| Sample 36 | 4 mm | 0.68 g/cm² | 0.39 | 1.83 | 2.50 |
| Sample 37 | 6 mm | 1.01 g/cm² | 0.20 | 0.42 | 1.04 |
| Sample 38 | 8 mm | 1.35 g/cm² | 0.18 | 0.25 | 0.58 |
| Sample 39 | 10 mm | 1.69 g/cm² | 0.18 | 0.22 | 0.38 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) | | |
|---|---|---|---|---|---|
| | | | 75 kV 480 sec | 100 kV 960 sec | 150 kV 240 sec |
| Sample 40 (Pb comparison) | 0.1 mm | 0.11 g/cm² | 6.50 | 6.50 | 6.50 |
| Sample 41 (Pb comparison) | 0.2 mm | 0.23 g/cm² | 3.55 | 6.50 | 6.50 |
| Sample 42 (Pb comparison) | 0.3 mm | 0.34 g/cm² | 2.03 | 6.50 | 6.50 |
| Sample 43 (Pb comparison) | 0.4 mm | 0.45 g/cm² | 1.22 | 6.50 | 6.15 |
| Sample 44 (Pb comparison) | 0.5 mm | 0.56 g/cm² | 0.80 | 5.18 | 4.30 |
| Sample 45 (Pb comparison) | 0.6 mm | 0.68 g/cm² | 0.55 | 3.75 | 3.25 |
| Sample 46 (Pb comparison) | 0.7 mm | 0.80 g/cm² | 0.42 | 2.82 | 2.44 |
| Sample 47 (Pb comparison) | 0.8 mm | 0.91 g/cm² | 0.33 | 2.11 | 1.83 |
| Sample 48 (Pb comparison) | 0.9 mm | 1.03 g/cm² | 0.30 | 1.61 | 1.41 |
| Sample 49 (Pb comparison) | 1.0 mm | 1.14 g/cm² | 0.27 | 1.29 | 1.19 |

For the same bulk covering of e.g. 0.68 g/cm², the degree of blackening for sample 36 at 75 kV was 0.39, at 100 kV was 1.83 and at 150 kV was 2.50, whereas the corresponding comparison sample (sample 45 (lead comparison)) allowed much more radiation to pass through and had a degree of blackening of 0.55, 3.75 and 3.25 respectively. Less blackening indicates a better screening effect. In the accelerating voltage region tested, the rubber mixture according to the invention with the mixture according to the invention had a better screening effect than lead. That means in practice: in order to produce the same radiation protection effect as lead, a smaller bulk covering is required, which can be achieved by a smaller thickness or a lower degree of filling by the samples. This leads to a weight saving and thus to increased wearer comfort for the items produced therefrom such as e.g. X-ray aprons.

Example 14

Sample 50

32.8 wt. % of the mixture according to the present invention from example 11 are added in 2-3 portions to 54.6 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 5.5 wt. % of Regal® SRF carbon black from Cabot, 1.6 wt. % of Rhenogran® P-50 anti-hydrolysis agent from Rhein-Chemie, polycarbodiimide, 0.8 wt. % of Rhenofit® DDA styrenated diphenylamine from Rhein-Chemie, 0.5 wt. % of stearic acid, 1.9 wt. % of Rhenofit® TAC triallyl cyanurate from Rhein-Chemie and 2.2 wt. % of Polydispersion® T α,α'-bis-(tert-butylperoxy)-diisopropylbenzene, peroxide cross-linker from Rhein-Chemie.

Sample 51

49.4 wt. % of the previously mixed mixture according to the present invention from example 11 are added in 2-3 portions to 41.2 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 4.1 wt. % of Regal® SRF carbon black from Cabot, 1.2 wt. % of Rhenogran® P-50 anti-hydrolysis agent from Rhein-Chemie, polycarbodiimide, 0.6 wt. % of Rhenofit® DDA styrenated diphenylamine from Rhein-Chemie, 0.4 wt. % of stearic acid, 1.4 wt. % of Rhenofit® TAC triallyl cyanurate from Rhein-Chemie and 1.5 wt. % of Polydispersion® T α,α'-bis-(tert-butylperoxy)-diisopropylbenzene, peroxide cross-linker from Rhein-Chemie.

Sample 52

66.1 wt. % of the mixture according to the present invention from example 11 are added in 2-3 portions to 27.5 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 2.8 wt. % of Regal® SRF carbon black from Cabot, 0.8 wt. % of Rhenogran® P-50 anti-hydrolysis agent from Rhein-Chemie, polycarbodiimide, 0.4 wt. % of Rhenofit® DDA styrenated diphenylamine from Rhein-Chemie, 0.3 wt. % of stearic acid, 1.0 wt. % of Rhenofit® TAC triallyl cyanurate from Rhein-Chemie and 1.1 wt. % of Polydispersion® T α,α'-bis-(tert-butylperoxy)-diisopropylbenzene, peroxide cross-linker from Rhein-Chemie.

Processing Samples 50 to 52

After renewed homogenization, the mixture can drawn out as a sheet on a roller or calandered. Production of the radiation-absorbing articles was achieved after pressure forming or calandering by vulcanizing at temperatures between 150° C. and 170° C. and is complete in 30 minutes.

Example 15

The rubber sheets prepared with the mixture exhibited the following mechanical properties:

| | Method | Sample 50 | Sample 51 | Sample 52 |
|---|---|---|---|---|
| Tear strength, MPa: | DIN 53504 | 10 | 10 | 10 |
| Elongation at break, %: | DIN 53504 | 250 | 250 | 250 |
| Modulus 200 %, MPa: | DIN 53504 | 6.5 | 6.5 | 6.5 |
| Hardness, Shore A: | DIN 53505 | 54 | 59 | 68 |

The rubber sheets produced with the mixture according to the invention had very good mechanical strengths with the degrees of filling tested. That leads to the conclusion that the cross-linking reaction proceeds largely unaffected by the mixture according to the invention. Sample 52 with the highest degree of filling does not exhibit the drop in tear strength that would be expected because the mixture according to the invention probably couples very well into the rubber matrix via hydrogen bridging bonds.

Example 16

79.6 wt. % of the mixture according to the present invention from example 7 was added in 2-3 portions to 15.9 wt. % of a synthetic elastomer (polychloroprene (Baypren® 210)) and homogenized on a roller system or an internal mixer. Then the following were added: 3.2 wt. % of naphthenic mineral oil (Circosol 4240), 0.2 wt. % of stabilizer (Rhenofit® DDA; styrenated diphenylamine), 0.3 wt. % of an acid trap (Maglite DE; magnesium oxide) and 0.7 wt. % of cross-linking chemicals (Zinkweiss Rotsiegel; (zinc oxide) Rhenogran® MTT (3-methyl-thiazolidinethione-2), Vulkacit® ZBEC/C (zinc dibenzyldithiocarbamate). After renewed homogenization, the mixture can drawn out as a sheet on a roller or calandered. Production of the radiation-absorbing articles was achieved by vulcanizing at temperatures between 150° C. and 170° C. and is complete in 30 minutes. The following properties are achieved:

Samples of the mixture according to the present invention from example 7 and the rubber were prepared by the process described above:

| Name | Additive content [$k_A$] | Density [$\rho_p$] |
|---|---|---|
| Sample 53 | 79.6 wt. % | 3.734 g/cm³ |

| Name | Thickness [$d_p$] | Bulk covering [$m_A$] |
|---|---|---|
| Sample 53 | 2 mm | 0.59 g/cm² |
| Sample 54 | 4 mm | 1.19 g/cm² |
| Sample 55 | 6 mm | 1.78 g/cm² |
| Sample 56 | 8 mm | 2.38 g/cm² |
| Sample 57 | 10 mm | 2.97 g/cm² |

$mA = k_A \cdot \rho_p \cdot d_p$
Bulk covering = proportion by weight of mixture in the sample x density of the sample x thickness of the sample

Example 17

Testing the Radiation Protection Properties

Step wedges were produced from the 20 cm×20 cm×2 mm rubber sheets by gluing them together. Areas with 2, 4, 6, 8 and 10 mm thickness were produced. The step wedges were exposed to X-radiation of beam quality U=100 kV, eff. filtering 2.5 mm Al, tungsten direct current X-ray tube for 960 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 53 | 2 mm | 0.59 g/cm² | 2.60 |
| Sample 54 | 4 mm | 1.19 g/cm² | 0.32 |
| Sample 55 | 6 mm | 1.78 g/cm² | 0.24 |
| Sample 56 | 8 mm | 2.38 g/cm² | 0.24 |
| Sample 57 | 10 mm | 2.79 g/cm² | 0.24 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) |
|---|---|---|---|
| Sample 58 (lead comparison) | 0.1 mm | 0.11 g/cm² | 6.15 |
| Sample 59 (lead comparison) | 0.2 mm | 0.23 g/cm² | 6.15 |
| Sample 60 (lead comparison) | 0.3 mm | 0.34 g/cm² | 6.15 |
| Sample 61 (lead comparison) | 0.4 mm | 0.45 g/cm² | 6.15 |
| Sample 62 (lead comparison) | 0.5 mm | 0.56 g/cm² | 4.49 |
| Sample 63 (lead comparison) | 0.6 mm | 0.68 g/cm² | 3.03 |
| Sample 64 (lead comparison) | 0.7 mm | 0.80 g/cm² | 2.13 |
| Sample 65 (lead comparison) | 0.8 mm | 0.91 g/cm² | 1.49 |
| Sample 66 (lead comparison) | 0.9 mm | 1.03 g/cm² | 1.10 |
| Sample 67 (lead comparison) | 1.0 mm | 1.14 g/cm² | 0.93 |

For the same bulk covering of 0.59 g/cm², the degree of blackening for sample 53 was 2.60, whereas the comparison sample (sample 62 (lead comparison)) allowed much more radiation to pass through and had a degree of blackening of 4.49. Less blackening indicates a better screening effect. That means in practice: in order to produce the same radiation protection effect as lead, a smaller bulk covering is required, which can be achieved by a smaller thickness or a lower degree of filling by the samples. This leads to a weight saving and thus to increased wearer comfort for the items produced therefrom such as e.g. X-ray aprons.

Example 18

The rubber sheets according to the present invention prepared with the mixture according to the invention, in accordance with example 17, exhibited the following mechanical properties:

|  | Method | Sample 53 |
|---|---|---|
| Tear strength, MPa: | DIN 53504 | 6.3 |
| Elongation at break, %: | DIN 53504 | 625 |
| Modulus 100 %, MPa: | DIN 53504 | 1.8 |
| Modulus 200 %, MPa: | DIN 53504 | 2.6 |
| Modulus 300 %, MPa: | DIN 53504 | 3.2 |
| Hardness, Shore A: | DIN 53505 | 61 |

Example 19

59.8 wt. % of the mixture according to the invention from example 7 and 19.8 wt. % of $BaSO_4$ were added in 2-3 portions to 15.9 wt. % of a synthetic elastomer (polychloroprene (Baypren® 210)) and homogenized on a roller system or an internal mixer. Then the following were added: 3.2 wt. % of naphthenic mineral oil (Circosol 4240; a mixture of alicyclic compounds, a fraction of petroleum), 0.2 wt. % of stabilizer (Rhenofit® DDA; styrenated diphenylamine), 0.3 wt. % of an acid trap (Maglite DE (magnesium oxide)) and 0.8 wt. % of cross-linking chemicals (0.3 wt. % of Zinkweiss Rotsiegel; (zinc oxide), 0.3 wt. % of Rhenogran® MTT (3-methyl-thiazolidinethione-2, 0.2 wt. % of Vulkacit® ZBEC/C (zinc dibenzyldithiocarbamate)).

After renewed homogenization, the mixture can be drawn out as a sheet on a roller or calandered. Production of the radiation-absorbing articles was achieved by vulcanizing at temperatures between 150° C. and 170° C. and is complete in 30 minutes.

| Name | Additive content [$k_A$] | Density [$\rho_p$] |
|---|---|---|
| Sample 68 | 80 wt. % | 3.50 g/cm$^3$ |

| Name | Thickness [$d_p$] | Bulk covering [mA] |
|---|---|---|
| Sample 68 | 2 mm | 0.56 g/cm$^2$ |
| Sample 69 | 4 mm | 1.12 g/cm$^2$ |
| Sample 70 | 6 mm | 1.68 g/cm$^2$ |
| Sample 71 | 8 mm | 2.24 g/cm$^2$ |
| Sample 72 | 10 mm | 2.80 g/cm$^2$ |

$mA = k_A \cdot \rho_p \cdot d_p$
Bulk covering = proportion by weight of mixture in the sample × density of the sample × thickness of the sample Example 20

Testing the Radiation Protection Properties

Step wedges were produced from the 20 cm×20 cm×2 mm rubber sheets by gluing them together. Areas with 2, 4, 6, 8 and 10 mm thickness were produced. The step wedges were exposed to X-radiation of beam quality U=100 kV, eff. filtering 2.5 mm Al, tungsten direct current X-ray tube for 480 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 68 | 2 mm | 0.56 g/cm$^2$ | 2.22 |
| Sample 69 | 4 mm | 1.12 g/cm$^2$ | 0.43 |
| Sample 70 | 6 mm | 1.68 g/cm$^2$ | 0.32 |
| Sample 71 | 8 mm | 2.24 g/cm$^2$ | 0.32 |
| Sample 72 | 10 mm | 2.80 g/cm$^2$ | 0.32 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [mA] | Blackening (relative units) |
|---|---|---|---|
| Sample 73 (lead comparison) | 0.1 mm | 0.11 g/cm$^2$ | 6.50 |
| Sample 74 (lead comparison) | 0.2 mm | 0.23 g/cm$^2$ | 6.50 |
| Sample 75 (lead comparison) | 0.3 mm | 0.34 g/cm$^2$ | 6.50 |
| Sample 76 (lead comparison) | 0.4 mm | 0.45 g/cm$^2$ | 4.67 |
| Sample 77 (lead comparison) | 0.5 mm | 0.56 g/cm$^2$ | 3.38 |
| Sample 78 (lead comparison) | 0.6 mm | 0.68 g/cm$^2$ | 2.50 |
| Sample 79 (lead comparison) | 0.7 mm | 0.80 g/cm$^2$ | 1.88 |
| Sample 80 (lead comparison) | 0.8 mm | 0.91 g/cm$^2$ | 1.43 |
| Sample 81 (lead comparison) | 0.9 mm | 1.03 g/cm$^2$ | 1.15 |
| Sample 82 (lead comparison) | 1.0 mm | 1.14 g/cm$^2$ | 0.97 |

For a comparable bulk covering of 1.12 g/cm$^2$ and 1.04 g/cm$^2$ the degree of blackening for sample 69 was 0.43, whereas the comparison sample (sample 81 (lead comparison)) allowed much more radiation to pass through and had a degree of blackening of 1.15. Less blackening indicates a better screening effect. That means in practice: in order to produce the same radiation protection effect as lead, a smaller bulk covering is required, which can be achieved by a smaller thickness or a lower degree of filling by the samples. This leads to a weight saving and thus to increased wearer comfort for the items produced therefrom such as e.g. X-ray aprons.

Even after replacing half of the mixture according to the invention with the less effective screening substance barium sulfate, the screening effect still remains high enough for this mixture according to the invention to be better than lead.

Example 21

The rubber sheets prepared with the mixture according to the present invention from example 20 exhibited the following mechanical properties:

| | Method | Sample 68 |
|---|---|---|
| Tear strength, MPa: | DIN 53504 | 6.2 |
| Elongation at break, %: | DIN 53504 | 674 |
| Modulus 100%, MPa: | DIN 53504 | 2.9 |
| Modulus 200%, MPa: | DIN 53504 | 3.6 |
| Modulus 300%, MPa: | DIN 53504 | 3.8 |
| Hardness, Shore A: | DIN 53505 | 66 |

Example 22 a) Raw Materials Used and their Composition

A mixture according to the invention was prepared as radiation protection from the following components:

| Name | Proportion in the mixture |
|---|---|
| Gadolinium oxide | 45 wt. % |
| Tungsten powder | 55 wt. % | b) Preparation of the Mixture According to the Invention

Before use, the gadolinium concentrate and tungsten powder were dried for 2 hours at a temperature of 120° C. and classified through sieve 063 (tungsten through sieve 016). Then the three components were mixed for 1.5 hours in a tumble mixer.

A white, free-flowing, lump-free powder was obtained as a mixture according to the invention.

Example 23

66.1 wt. % of the previously prepared mixture according to the present invention from example 22 is added in 2-3 portions to 27.5 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 2.8 wt. % of Regal® SRF carbon black from Rhein Chemie, 0.8 wt. % of Rhenogran® P-50 anti-hydrolysis agent from Rhein-Chemie, polycarbodiimide, 0.4 wt. % of Rhenofit® DDA styrenated diphenylamine from Rhein-Chemie, 0.3 wt. % of stearic acid, 1.0 wt. % of Rhenofit® TAC triallyl cyanurate from Rhein-Chemie and 1.1 wt. % of Polydispersion® T α,α'-bis-(tert-butylperoxy)-diisopropylbenzene, peroxide cross-linker from Rhein-Chemie. After renewed homogenization, the mixture can be drawn out as a sheet on a roller or calandered. Production of the radiation-absorbing articles was achieved after pressure forming or calandering by vulcanizing at temperatures between 150° C. and 170° C. and was completed in 30 minutes.

Samples of the mixture according to the invention from example 22 and the rubber were prepared by the process described above:

| Name | Additive content |
|---|---|
| Sample 83 | 66.1 wt. % |

Example 24

79.6 wt. % of the previously prepared mixture according to the invention from example 22 are added in 2-3 portions to 16.6 wt. % of a synthetic elastomer (EVM ethylene/vinylacetate copolymer with about 40 wt. % of ethylene and about 60 wt. % of vinyl acetate) (Levapren® 600 HV) and homogenized on a roller system or internal mixer. Then the following were added: 1.6 wt. % of Regal® SRF carbon black from Rhein Chemie, 0.5 wt. % of Rhenogran® P-50 anti-hydrolysis agent from Rhein-Chemie, polycarbodiimide, 0.2 wt. % of stabilizer, Rhenofit® DDA styrenated diphenylamine from Rhein-Chemie, 0.2 wt. % of stearic acid, 0.6 wt. % of Rhenofit® TAC triallyl cyanurate from Rhein-Chemie and 0.7 wt. % of Polydispersion® T α,α'-bis-(tert-butylperoxy)-diisopropylbenzene, peroxide cross-linker from Rhein-Chemie. After renewed homogenization, the mixture could be drawn out as a sheet on a roller or calandered. Production of the radiation-absorbing articles was achieved after pressure forming or calandering by vulcanizing at temperatures between 150° C. and 170° C. and was completed in 30 minutes.

Samples of the mixture according to the invention from example 22 and the rubber were prepared by the process described above:

| Name | Additive content |
|---|---|
| Sample 84 | 79.6 wt. % |

Example 25

The rubber sheets prepared with the mixture according to the invention exhibited the following mechanical properties:

|  | Method | Sample 83 | Sample 84 |
|---|---|---|---|
| Tear strength, MPa: | DIN 53504 | 8.9 | 6.6 |
| Elongation at break, %: | DIN 53504 | 243 | 222 |
| Modulus 200%, MPa: | DIN 53504 | 2.7 | 3.4 |
| Hardness, Shore A: | DIN 53505 | 63 | 75 |

The rubber sheets prepared with the mixture according to the invention exhibited very good mechanical strengths with the degrees of filling tested. That leads to the conclusion that the cross-linking reaction proceeds largely unaffected by the mixture according to the present invention.

Example 26

Non-reinforced PA 6 (Durethen® B31F, a commercial product from Bayer AG) was processed to give a homogeneous compound with the mixture according to the invention from example 7 with the addition of 0.2 wt. % of mould release agent (Licowax® E flakes; a commercial product from Clariant AG, an ester of montanic acid with an acid value of 15-20, a saponification value of 145-165 and a density of 1.01-1.03 g/cm$^3$) by compounding on a twin-shaft extruder (ZSK 25 from Werner & Pfleiderer) at a bulk temperature of about 245° C. and with a throughput of 7 kg/h. The melt was then spun off via a belt pull-off and granulated.

The granules obtained were processed on an injection molding machine of the Arburg 320-210-500 type under conventional molding composition conditions (bulk temperature of about 270° C., mould temperature 80° C.) to give standard test specimens for mechanical testing and to give 1 mm thick sheets (105 mm×150 mm).

The following molding compositions and samples were prepared from the mixture according to the invention and the thermoplastic material using the process described above:

| Name | Additive content [$k_A$] | Density [$\rho_p$] |
|---|---|---|
| Sample 85 | 50 wt. % | 1.903 g/cm$^3$ |

| Name | Thickness [$d_p$] | Bulk covering [$m_A$] |
|---|---|---|
| Sample 85 | 2 mm | 0.19 g/cm$^2$ |
| Sample 86 | 4 mm | 0.38 g/cm$^2$ |
| Sample 87 | 6 mm | 0.57 g/cm$^2$ |

-continued

| Name | Thickness [$d_p$] | Bulk covering [$m_A$] |
|---|---|---|
| Sample 88 | 8 mm | 0.76 g/cm² |
| Sample 89 | 10 mm | 0.95 g/cm² |

$m_A = k_A \cdot \rho_p \cdot d_p$
Bulk covering = proportion by weight of mixture in the sample × density of the sample × thickness of the sample

Example 27

Testing the Radiation Protection Properties

Step wedges were produced from the 105 mm×150 cm×1 mm polyamide sheets by gluing them together. Areas with 2, 4, 6, 8 and 10 mm thickness were produced. The step wedges were exposed to X-radiation of beam quality U=100 kV, eff. filtering 2.5 mm Al, tungsten direct current X-ray tube for 960 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect

| Name | Thickness [$d_p$] | Bulk covering [$m_A$] | Blackening (relative units) |
|---|---|---|---|
| Sample 85 | 2 mm | 0.19 g/cm² | 6.5 |
| Sample 86 | 4 mm | 0.38 g/cm² | 6.5 |
| Sample 87 | 6 mm | 0.57 g/cm² | 3.18 |
| Sample 88 | 8 mm | 0.76 g/cm² | 1.74 |
| Sample 89 | 10 mm | 0.95 g/cm² | 0.88 |

The lead samples used for calibration and comparison samples were prepared from lead foils of grade S1 with a thickness of 0.1 mm. Step wedges like those for the samples were prepared. The test region covered the lead equivalents from 0.1 to 1.0 mm.

| Name | Thickness [$d_p$] | Bulk covering [$m_A$] | Blackening (relative units) |
|---|---|---|---|
| Sample 90 (lead comparison) | 0.1 mm | 0.11 g/cm² | 6.5 |
| Sample 91 (lead comparison) | 0.2 mm | 0.23 g/cm² | 6.5 |
| Sample 92 (lead comparison) | 0.3 mm | 0.34 g/cm² | 6.5 |
| Sample 93 (lead comparison) | 0.4 mm | 0.45 g/cm² | 6.5 |
| Sample 94 (lead comparison) | 0.5 mm | 0.56 g/cm² | 5.18 |
| Sample 95 (lead comparison) | 0.6 mm | 0.68 g/cm² | 3.75 |
| Sample 96 (lead comparison) | 0.7 mm | 0.80 g/cm² | 2.82 |
| Sample 97 (lead comparison) | 0.8 mm | 0.91 g/cm² | 2.11 |
| Sample 98 (lead comparison) | 0.9 mm | 1.03 g/cm² | 1.61 |
| Sample 99 (lead comparison) | 1.0 mm | 1.14 g/cm² | 1.29 |

For the same bulk covering of 0.56 g/cm², the degree of blackening for sample 85 was 3.18, whereas the comparison sample (sample 94 (lead comparison)) allowed much more radiation to pass through and had a degree of blackening of 5.18. Less blackening indicates a better screening effect. That means that for the same radiation protection effect as lead, a smaller bulk covering is required, which can be achieved by a smaller thickness or a lower degree of filling by the samples. This leads to a weight saving.

Example 28

Mechanical Data for Sample 83

| | Standard | Units | Sample 85 |
|---|---|---|---|
| Bending stress 3.5% | ISO 178 | [MPa] | 113 |
| Outer fiber strain | ISO 178 | [%] | 5.1 |
| Bending strength | ISO 178 | [MPa] | 122 |
| Bending modulus | ISO 178 | [MPa] | 3930 |
| Breaking stress | ISO 527 | [MPa] | 69 |
| Elongation at break | ISO 527 | [%] | 6 |
| Tensile modulus | ISO 527 | [MPa] | 4150 |
| Izod impact strength | ISO 180 1U | [kJ/m²] | 49 |

The mechanical properties for sample 85 are of the order of magnitude which could be expected for e.g. conventional mineral-filled polyamide 6 compounds. The solution viscosity of the PA6 was not altered by the compounding process, i.e. the thermoplastic molding composition filled with the mixture according to the invention did not lead to degradation or building up of the polymer.

Example 29

Components Used

A.1) Graft rubber of 50 wt. % polybutadiene with an average particle diameter ($d_{50}$) of 0.35 μm onto which were graft polymerized 36.5 wt. % of styrene and 13.5 wt. % of acrylonitrile in emulsion.

A.2) Graft rubber of 50 wt. % polybutadiene with an average particle diameter ($d_{50}$) of 0.1 μm onto which were graft polymerized 36.5 wt. % of styrene and 13.5 wt. % of acrylonitrile in emulsion.

A.3) Styrene/acrylonitrile (SAN)=72:28—copolymer with an average molecular weight of about 85,000, prepared by solution polymerisation.

B) 60 parts by wt. of the mixture according to the invention from example 7.

Preparing and Testing the Molding Compositions

The individual components A.1) to A.3) and B) are mixed in an internal compounder, together with 2 parts by wt. of ethylene bisstearylamide and 0.2 parts by wt. of silicone oil, at 200° C. to 230° C. for 3 to 5 minutes and then granulated.

The granules are compressed at 190° C. (compression time with no pressure 2 min; compression time at 200 bar 8 min) to give 1 mm thick sheets. The sample specimens required are prepared by sawing out or punching out.

| Name | Additive content [$k_A$] | Density [$\rho_p$] |
|---|---|---|
| Sample 100 | 60 wt. % | 2.141 g/cm³ |

| Name | Thickness [$d_p$] | Bulk covering [$m_A$] |
|---|---|---|
| Sample 100 | 2 mm | 0.26 g/cm² |
| Sample 101 | 4 mm | 0.51 g/cm² |

-continued

| Name | Thickness [$d_p$] | Bulk covering [$m_A$] |
|---|---|---|
| Sample 102 | 6 mm | 0.77 g/cm² |
| Sample 103 | 8 mm | 1.03 g/cm² |
| Sample 104 | 10 mm | 1.28 g/cm² |

$m_A = k_A \cdot \rho_p \cdot d_p$
Bulk covering = proportion by weight of mixture in the sample × density of the sample × thickness of the sample Example 30

Testing the Radiation Protection Properties

Step wedges were produced from the 100 mm×100 cm×1 mm ABS sheets by glueing them together. Areas with 2, 4, 6, 8 and 10 mm thickness were produced. The step wedges were exposed to X-radiation of beam quality U=150 kV, eff. filtering 2.5 mm Al, tungsten direct current X-ray tube for 240 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 100 | 2 mm | 0.26 g/cm² | 6.50 |
| Sample 101 | 4 mm | 0.51 g/cm² | 2.46 |
| Sample 102 | 6 mm | 0.77 g/cm² | 1.12 |
| Sample 103 | 8 mm | 1.03 g/cm² | 0.69 |
| Sample 104 | 10 mm | 1.28 g/cm² | 0.52 |

The lead samples used for calibration and comparison samples were prepared from lead foils of grade S1 with a thickness of 0.1 mm. Step wedges like those for the samples were prepared. The test region covered the lead equivalents from 0.1 to 1.0 mm.

| Name | Thickness [$d_p$] | Bulk covering [$m_A$] | Blackening (relative units) |
|---|---|---|---|
| Sample 105 (lead comparison) | 0.1 mm | 0.11 g/cm² | 6.50 |
| Sample 106 (lead comparison) | 0.2 mm | 0.23 g/cm² | 6.50 |
| Sample 107 (lead comparison) | 0.3 mm | 0.34 g/cm² | 6.50 |
| Sample 108 (lead comparison) | 0.4 mm | 0.45 g/cm² | 4.60 |
| Sample 109 (lead comparison) | 0.5 mm | 0.56 g/cm² | 3.18 |
| Sample 110 (lead comparison) | 0.6 mm | 0.68 g/cm² | 2.20 |
| Sample 111 (lead comparison) | 0.7 mm | 0.80 g/cm² | 1.55 |
| Sample 112 (lead comparison) | 0.8 mm | 0.91 g/cm² | 1.17 |
| Sample 113 (lead comparison) | 0.9 mm | 1.03 g/cm² | 0.76 |
| Sample 114 (lead comparison) | 1.0 mm | 1.14 g/cm² | 0.72 |

For the same bulk covering of 0.51 g/cm², the degree of blackening for sample 99 was 2.46, whereas the comparison sample (sample 109 (lead comparison)) allowed much more radiation to pass through and had a degree of blackening of 3.18. Less blackening indicates a better screening effect. That means that for the same radiation protection effect as lead, a smaller bulk covering is required, which can be achieved by a smaller thickness or a lower degree of filling by the samples. This leads to a weight saving.

Example 31

Mechanical Data for Sample 100 from Example 29

Tensile tests at room temperature using 2 mm thick rods with shoulders, with a crosshead speed of 5 mm/min.
Sheet penetration test at room temperature, based on DIN 53 443 (differently from the DIN, the mandrel with a 20 mm diameter was combined with a guide tube with a 40 mm diameter), using 2 mm round discs with a diameter of 60 mm. Rate of fall 3 m/sec; energy delivered 13.3 J.

|  | Standard | Units | Sample 85 |
|---|---|---|---|
| Tensile test | ISO 527 |  |  |
| Tensile E modulus | ISO 527 | MPa | 2650 |
| Yield stress | ISO 527 | MPa | 27 |
| Elongation | ISO 527 | % | 1.7 |
| Elongation at break | ISO 527 | % | 2 |
| Sheet penetration test | Analogous to DIN 53 443 |  |  |
| Energy absorbed |  | Nm | 0.01 |
| Deformation |  | mm | 0.38 |
| Maximum force |  | N | 63 |

The mechanical properties for sample 100 are of the order of magnitude which could be expected for e.g. conventional mineral-filled ABS compounds. The viscosity of the ABS was not altered by the compounding process, i.e. the thermoplastic moulding composition filled with the mixture according to the invention did not lead to degradation or building up of the polymer.

Example 32

Starting Components/Specimens

A so-called one-component system is used as a polyurethane system for example 32. This is a formulation which contains all the starting components required to prepare a polyurethane (polyisocyanate, polyol mixture, additives). These systems are described in DE-A 3 230 757; page 16, line 60 to page 19, line 51 and DE-A 3 727 128; column 13, line 28 to, column 16, line 45.

A high-melting, finely divided (average particle size 5-25 μm) solid diisocyanate is used as the polyisocyanate, which is deactivated by a thin polyurea envelope. This deactivation makes the formulation storage-stable up to about 50° C. By heating to temperatures of at least 100° C., the deactivation is broken down and the polyisocyanate released can react with the polyol components present. N,N'-di-(4-methyl-3-isocyanatophenyl)urea is preferably used as the solid diisocyanate, the preparation of which is described in DE-A 3 826 447.

A storage-stable polyurethane one-component system of the type mentioned above is offered by Bayer AG as a trial product under the product name VP.PU 50EL08, this being composed of a polyol mixture and the solid diisocyanate mentioned above. This system has a viscosity of about 13 Pa*s at room temperature and is cured by heating to about 100-150° C.

The following components were admixed with this final mixture (example 32a) in the amounts given in Table 1:
1. the mixture according to the present invention
2. an aliphatic polyamine (Jeffamine® T 403, a liquid which is colourless at room temperature, from the Huntsman Co., a polyethertriamine started on a trimethylolpropane (TMP) base with 5-6 moles of propylene oxide per mole of TMP, amine content 6 milliequivalents/g) to compensate for the elevated mechanical stress during incorporation of the additives by mixing into the one-component VP.PU 50EL08 system,
3. catalyst Octa-Soligen® Pb 30-31 (lead(II)-2-ethylhexanoate from Borchers, 40789 Monheim) to adapt the rate of curing to the filler content.

The additives mentioned were added to the VP.PU 50EL08 and carefully blended with a slow-running toothed ring stirrer at up to 35° C. Then this mixture was carefully stirred for about 15 minutes at up to 40° C. in an evacuated flask (20 mbar) in order to remove stirred-in air and to homogenise the mixture (example 32b).

The evacuated mixtures, each slightly warmed (to about 40° C.), were applied to a flat metal 20*20 cm mould with a layer thickness of about 3 mm and, after levelling, cured for 3 hours in a heating cupboard at 140° C.

The mechanical characteristics of the sample sheets prepared were determined and the blackening curves were recorded and evaluated.

Example 33

Mechanical Values of the Specimens

Table 1 shows the composition of the samples from examples 32a and 32b and the mechanical characteristics of the cured elastomer samples.

TABLE 1

| Ex. | VPPU 50EL08 | (pts. by wt.) | Jeffamin T403 (pts. wt.) | Amount of inorg. additives (pts. wt.) | Conc. of inorg. additives (pts. wt.) | Pb 30-31 added | Viscosity [Pa * s] | Hardness [Shore A] DIN 53505 | Tensile strength [MPa] DIN 53504 | Elong. at break [%] DIN 53504 | Tear prop. resist. [kN/m] DIN 53515 | Elasticity [%] DIN 53512 |
|---|---|---|---|---|---|---|---|---|---|---|---|---|
| 32a | Pt. 126 | 100 | | 0 | 0.0 | | 13 | 73 | 6.9 | 220 | 15.3 | 44 |
| 32b | Pt. 126 | 100 | 0.15 | 60 | 37.4 | 0.40 | 30 | 84 | 9.3 | 280 | 18.5 | 36 |

The table shows that the mixture according to the invention, as is conventional and known for standard fillers, increases the mechanical values for hardness, tensile strength, elongation at break and tear propagation resistance and reduces the elasticity and thus does not have any unacceptable or unexpected negative effects on the elastomer properties.

Bulk Covering of the Specimens

The elastomer from example 32b had a density of 1.537 g/cm$^3$.

Specimens with different thicknesses were prepared by gluing several films together. The following bulk coverings were produced, depending on the thickness of the sample:

(Bulk covering = proportion by weight of mixture in the sample × density of the sample × thickness of the sample: $mA = k_A \cdot \rho_p \cdot d_p$)

| Name | Thickness [$d_p$] | Bulk covering [$m_A$] |
|---|---|---|
| Sample 115 | 3.1 mm | 0.18 g/cm$^2$ |
| Sample 116 | 6.8 mm | 0.39 g/cm$^2$ |

-continued (Bulk covering = proportion by weight of mixture in the sample × density of the sample × thickness of the sample: $mA = k_A \cdot \rho_p \cdot d_p$)

| Name | Thickness [$d_p$] | Bulk covering [$m_A$] |
|---|---|---|
| Sample 117 | 10.3 mm | 0.59 g/cm$^2$ |
| Sample 118 | 13.8 mm | 0.79 g/cm$^2$ |
| Sample 119 | 17.6 mm | 1.01 g/cm$^2$ |

Example 34

Testing the Radiation Protection Properties

Step wedges were produced from the 200 mm×200 cm×ca. 3 mm PU sheets by glueing them together. Areas with the thicknesses given in the table were produced. The step wedges were exposed to X-radiation of beam quality U=150 kV, eff. filtering 2.5 mm Al, tungsten direct current X-ray tube for 240 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 115 | 3.1 mm | 0.18 g/cm$^2$ | 6.50 |
| Sample 116 | 6.8 mm | 0.39 g/cm$^2$ | 4.67 |
| Sample 117 | 10.3 mm | 0.59 g/cm$^2$ | 2.33 |

-continued

| Name | Thickness [$d_p$] | Bulk covering [$m_A$] | Blackening (relative units) |
|---|---|---|---|
| Sample 118 | 13.8 mm | 0.79 g/cm$^2$ | 1.28 |
| Sample 119 | 17.6 mm | 1.01 g/cm$^2$ | 0.84 |

The lead samples used for calibration and comparison samples were prepared from lead foils of grade S1 with a thickness of 0.1 mm. Step wedges like those for the samples were prepared. The test region covered the lead equivalents from 0.1 to 1.0 mm.

| Name | Thickness [$d_p$] | Bulk covering [$m_A$] | Blackening (relative units) |
|---|---|---|---|
| Sample 120 (lead comparison) | 0.1 mm | 0.11 g/cm$^2$ | 6.50 |
| Sample 121 (lead comparison) | 0.2 mm | 0.23 g/cm$^2$ | 6.50 |

-continued

| Name | Thickness [$d_p$] | Bulk covering [$m_A$] | Blackening (relative units) |
|---|---|---|---|
| Sample 122 (lead comparison) | 0.3 mm | 0.34 g/cm² | 6.50 |
| Sample 123 (lead comparison) | 0.4 mm | 0.45 g/cm² | 4.60 |
| Sample 124 (lead comparison) | 0.5 mm | 0.56 g/cm² | 3.18 |
| Sample 125 (lead comparison) | 0.6 mm | 0.68 g/cm² | 2.20 |
| Sample 126 (lead comparison) | 0.7 mm | 0.80 g/cm² | 1.55 |
| Sample 127 (lead comparison) | 0.8 mm | 0.91 g/cm² | 1.17 |
| Sample 128 (lead comparison) | 0.9 mm | 1.03 g/cm² | 0.76 |
| Sample 129 (lead comparison) | 1.0 mm | 1.14 g/cm² | 0.72 |

For the same bulk covering of 0.59 g/cm², the degree of blackening for sample 115 was 2.33, whereas the comparison sample (sample 124 (lead comparison)) allowed much more radiation to pass through and had a degree of blackening of 3.18. Less blackening indicates a better screening effect. That means in practice: in order to produce the same radiation protection effect as lead, a smaller bulk covering is required, which can be achieved by a smaller thickness or a lower degree of filling by the samples. This leads to a weight saving.

In the table given below, the bulk covering required for a desired blackening effect (=reciprocal of screening effect) for lead and for the filler used in example 32b are shown. In the right-hand column it can be seen that the bulk covering required for the filler from example 32b, depending on the degree of screening required, is 5-25% less than when using lead.

Bulk covering required for a defined blackening effect

| | Bulk covering | | |
|---|---|---|---|
| Blackening | lead | example 32b | difference* |
| 4.0 | 0.497 | 0.366 | 26.4 |
| 3.0 | 0.581 | 0.493 | 15.1 |
| 2.0 | 0.717 | 0.641 | 10.6 |
| 1.0 | 0.954 | 0.912 | 4.4 |

*with respect to lead in [%]

Example 35

Comparative

The mixture with the following composition is prepared from rare earths and tungsten powder using the process described in example 1:

| Rare earths | Proportion in the mixture |
|---|---|
| $La_2O_3$ | 13.5% |
| $CeO_2$ | 27% |
| $Nd_2O_3$ | 7.5% |
| $Gd_2O_3$ | 25% |
| W | 27.3% |

Before use, the rare earths and the tungsten powder are dried for 2 hours at a temperature of 120° C. and screened through sieve 063 (tungsten through sieve 016). Then the two components are mixed in a tumble mixer for 2 hours.

Example 36

Comparative 66.1 wt. % of the previously prepared mixture (according to example 35) were added in 2-3 portions to 27.5 wt. % of Natural Rubber® TSR 5 and homogenised on a roller or in an internal mixer. Then the following were added: 2.8 wt. % of Enerthene® 1849-1, a naphthenic process oil from BP, 0.4 wt. % of Vulkanox® BKF, as antioxidant from Bayer AG, 0.4 wt. % of Vulkanox® MB, an antioxidant from Bayer AG, 0.8 wt. % of zinc oxide RS, 0.6 wt. % of stearic acid, 0.4 wt. % of Vulkacit® CZ, a vulcanisation accelerator from Bayer AG, 0.1 wt. % of Vulkacit® D, a vulcanisation accelerator from Bayer AG and 0.8 wt. % of sulfinur Rhenocure® IS 60/G 75. After renewed homogenisation, the mixture could be drawn out into a sheet on a roller or calandered. Production of the radiation-absorbing articles was achieved after pressure forming or calandering by vulcanising at temperatures between 150° C. and 170° C. and was completed in 30 minutes.

Samples of the mixture from example 35 and the rubber were prepared by the process described above:

| Name | Additive content [$k_A$] | Density [$\rho_P$] |
|---|---|---|
| Sample 130 | 66.1 wt. % | 2.281 g/cm³ |

| Name | Thickness [$d_p$] | Bulk covering [$m_A$] |
|---|---|---|
| Sample 130 | 2 mm | 0.30 g/cm² |
| Sample 131 | 4 mm | 0.60 g/cm² |
| Sample 132 | 6 mm | 0.90 g/cm² |
| Sample 133 | 8 mm | 1.21 g/cm² |
| Sample 134 | 10 mm | 1.51 g/cm² |

$m_A = k_A \cdot \rho_P \cdot d_P$
Bulk covering = proportion by weight of mixture in the sample × density of the sample × thickness of the sample Example 37

Testing the Radiation Protection Properties

Step wedges were produced from the 20 mm×20 cm×2 mm rubber sheets by glueing them together. Areas with 2, 4, 6, 8 and 10 mm thickness were produced. The step wedges were exposed to X-radiation of beam quality U=100 kV, eff. filtering 2.5 mm Al, tungsten direct current X-ray tube for 960 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 130 | 2 mm | 0.30 g/cm² | 6.50 |
| Sample 131 | 4 mm | 0.60 g/cm² | 2.98 |
| Sample 132 | 6 mm | 0.90 g/cm² | 0.85 |
| Sample 133 | 8 mm | 1.21 g/cm² | 0.38 |
| Sample 134 | 10 mm | 1.51 g/cm² | 0.29 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) |
|---|---|---|---|
| Sample 135 (lead comparison) | 0.1 mm | 0.11 g/cm² | 6.50 |
| Sample 136 (lead comparison) | 0.2 mm | 0.23 g/cm² | 6.50 |
| Sample 137 (lead comparison | 0.3 mm | 0.34 g/cm² | 6.50 |
| Sample 138 (lead comparison) | 0.4 mm | 0.45 g/cm² | 6.50 |
| Sample 139 (lead comparison) | 0.5 mm | 0.56 g/cm² | 6.11 |
| Sample 140 (lead comparison) | 0.6 mm | 0.68 g/cm² | 4.23 |
| Sample 141 (lead comparison) | 0.7 mm | 0.80 g/cm² | 3.07 |
| Sample 142 (lead comparison) | 0.8 mm | 0.91 g/cm² | 2.27 |
| Sample 143 (lead comparison) | 0.9 mm | 1.03 g/cm² | 1.76 |
| Sample 144 (lead comparison) | 1.0 mm | 1.14 g/cm² | 1.43 |

In the bulk covering range tested, from 0.5 g/cm² to 1.4 g/cm², although the degree of blackening for samples 130 to 134 is lower than for lead, it is considerably higher than for samples 20 to 24 according to the invention (example 9). Less blackening indicates a better screening effect. Samples 20 to 24 according to the invention screen better than lead and better than samples 130 to 134 not according to the invention.

Example 38

A mixture with the following composition is prepared from rare earths and tungsten powder using the process described in example 1:

| Rare earths | Proportion in the mixture according to the invention |
|---|---|
| Gd₂O₃ | 55% |
| Sn | 30% |
| W | 15% |

Before use, the rare earths and the tungsten and tin powders are dried for 2 hours at a temperature of 120° C. and screened through sieve 063 (tungsten through sieve 016). Then the three components are mixed in a tumble mixer for 2 hours.

Example 39

66.2 wt. % of the previously prepared mixture according to the invention (according to example 38) were added in 2-3 portions to 27.5 wt. % of Natural Rubber® TSR 5 and homogenised on a roller or in an internal mixer. Then the following were added: 2.8 wt. % of Enerthene® 1849-1, a naphthenic process oil from BP, 0.4 wt. % of Vulkanox® BKF, as antioxidant from Bayer AG, 0.4 wt. % of Vulkanox® MB, an antioxidant from Bayer AG, 0.8 wt. % of zinc oxide RS, 0.6 wt. % of stearic acid, 0.4 wt. % of Vulkacit® CZ, a vulcanisation accelerator from Bayer AG, 0.1 wt. % of Vulkacit® D, a vulcanisation accelerator from Bayer AG and 0.8 wt. % of sulfur Rhenocure® IS 60/G 75. After renewed homogenisation, the mixture could be drawn out into a sheet on a roller or calandered. Production of the radiation-absorbing articles was achieved after pressure forming or calandering by vulcanising at temperatures between 150° C. and 170° C. and was completed in 30 minutes.

Samples of the mixture according to the invention from example 38 and the rubber were prepared by the process described above:

| Name | Additive content [$k_A$] | Density [$\rho_p$] |
|---|---|---|
| Sample 145 | 66.1 wt. % | 2.300 g/cm³ |

| Name | Thickness [$d_p$] | Bulk covering [$m_A$] |
|---|---|---|
| Sample 145 | 2 mm | 0.30 g/cm² |
| Sample 146 | 4 mm | 0.61 g/cm² |
| Sample 147 | 6 mm | 0.91 g/cm² |
| Sample 148 | 8 mm | 1.22 g/cm² |
| Sample 149 | 10 mm | 1.52 g/cm² |

$m_A = k_A \cdot \rho_p \cdot d_p$
Bulk covering = proportion by weight of mixture in the sample × density of the sample × thickness of the sample

Example 40

Testing the Radiation Protection Properties

Step wedges were produced from the 20 mm×20 cm×2 mm rubber sheets by glueing them together. Areas with 2, 4, 6, 8 and 10 mm thickness were produced. The step wedges were exposed to X-radiation of beam quality U=150 kV, eff. filtering 2.5 mm Al, tungsten direct current X-ray tube for 120 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 145 | 2 mm | 0.30 g/cm² | 4.30 |
| Sample 146 | 4 mm | 0.61 g/cm² | 1.58 |
| Sample 147 | 6 mm | 0.91 g/cm² | 0.81 |
| Sample 148 | 8 mm | 1.22 g/cm² | 0.51 |
| Sample 149 | 10 mm | 1.52 g/cm² | 0.37 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) |
|---|---|---|---|
| Sample 150 (lead comparison) | 0.1 mm | 0.11 g/cm$^2$ | 6.50 |
| Sample 151 (lead comparison) | 0.2 mm | 0.23 g/cm$^2$ | 6.50 |
| Sample 152 (lead comparison) | 0.3 mm | 0.34 g/cm$^2$ | 5.40 |
| Sample 153 (lead comparison) | 0.4 mm | 0.45 g/cm$^2$ | 3.68 |
| Sample 154 (lead comparison) | 0.5 mm | 0.56 g/cm$^2$ | 2.65 |
| Sample 155 (lead comparison) | 0.6 mm | 0.68 g/cm$^2$ | 1.98 |
| Sample 156 (lead comparison) | 0.7 mm | 0.80 g/cm$^2$ | 1.39 |
| Sample 157 (lead comparison) | 0.8 mm | 0.91 g/cm$^2$ | 1.04 |
| Sample 158 (lead comparison) | 0.9 mm | 1.03 g/cm$^2$ | 0.83 |
| Sample 159 (lead comparison) | 1.0 mm | 1.14 g/cm$^2$ | 0.71 |

Example 41

Comparative a) Raw Materials Used and their Composition

A mixture not according to the invention was prepared from the following components:

| Name | Proportion in the mixture not according to the invention |
|---|---|
| Gadolinium oxide | 75 wt. % |
| Tungsten powder | 5 wt. % |
| Tin powder | 20 wt. % | b) Preparation of the Inorganic Radiation Protection Mixture

Before use, the gadolinium oxide and the tungsten powder were dried for 2 hours at a temperature of 120° C. and screened through sieve 063 (tungsten through sieve 016). Then the three components are mixed in a tumble mixer for 1.5 hours.

A white, free-flowing, lump-free powder was obtained as the mixture not according to the invention.

Example 42

Comparative 66.1 wt. % of the previously prepared mixture not according to the invention from example 41 are added in 2-3 portions to 27.5 wt. % of a synthetic elastomer (EVM ethylene/vinylacetate copolymer with about 40 wt. % of ethylene and about 60 wt. % of vinyl acetate) (Levapren® 600 HV) and homogenised on a roller system or internal mixer. Then the following were added: 2.8 wt. % of Regal® SRF carbon black from Rhein-Chemie, 0.8 wt. % of Rhenogran® P-50 anti-hydrolysis agent from Rhein-Chemie, polycarbodiimide, 0.4 wt. % of Rhenofit® DDA styrenated diphenylamine from Rhein-Chemie, 0.3 wt. % of stearic acid, 1.0 wt. % of Rhenofit® TAC triallyl cyanurate from Rhein-Chemie and 1.1 wt. % of Polydispersion® T α,α'-bis-(tert-butylperoxy)-diisopropylbenzene, peroxide cross-linker from Rhein-Chemie. After renewed homogenisation, the mixture could be drawn out as a sheet on a roller or calandered. Production of the radiation-absorbing articles was achieved after pressure forming or calandering by vulcanizing at temperatures between 150° C. and 170° C. and was completed in 30 minutes.

Samples of the mixture not according to the invention from example 41 and the rubber were prepared by the process described above:

| Name | Additive content [$k_A$] | Density [$\rho_p$] |
|---|---|---|
| Sample 160 | 66.1 wt. % | 2.42 g/cm$^3$ |

Example 43

Testing the Radiation Protection Properties

Step wedges were produced from the 20 cm×20 cm×2 mm rubber sheets by glueing them together. Areas with 2, 4, 6, 8 and 10 mm thickness were produced. The step wedges were exposed to X-radiation of beam quality U=150 kV, eff. filtering 2.5 mm Al, tungsten direct current X-ray tube for 120 s and the X-ray film was evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 160 | 2 mm | 0.39 g/cm$^2$ | 4.38 |
| Sample 161 | 4 mm | 0.77 g/cm$^2$ | 2.01 |
| Sample 162 | 6 mm | 1.16 g/cm$^2$ | 1.11 |
| Sample 163 | 8 mm | 1.54 g/cm$^2$ | 0.70 |
| Sample 164 | 10 mm | 1.93 g/cm$^2$ | 0.47 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) |
|---|---|---|---|
| Sample 165 (lead comparison) | 0.1 mm | 0.11 g/cm$^2$ | 6.50 |
| Sample 166 (lead comparison | 0.2 mm | 0.23 g/cm$^2$ | 6.50 |
| Sample 167 (lead comparison) | 0.3 mm | 0.34 g/cm$^2$ | 4.55 |
| Sample 168 (lead comparison) | 0.4 mm | 0.45 g/cm$^2$ | 3.27 |

-continued

| Name | Thickness [$d_p$] | Bulk covering [$m_A$] | Blackening (relative units) |
|---|---|---|---|
| Sample 169 (lead comparison) | 0.5 mm | 0.56 g/cm² | 2.42 |
| Sample 170 (lead comparison) | 0.6 mm | 0.68 g/cm² | 1.83 |
| Sample 171 (lead comparison) | 0.7 mm | 0.80 g/cm² | 1.28 |
| Sample 172 (lead comparison) | 0.8 mm | 0.91 g/cm² | 1.02 |
| Sample 173 (lead comparison) | 0.9 mm | 1.03 g/cm² | 0.81 |
| Sample 174 (lead comparison) | 1.0 mm | 1.14 g/cm² | 0.70 |

In the bulk covering range tested, from 0.5 g/cm² to 1.4 g/cm², the degree of blackening for samples 160 to 164 not according to the invention is higher than for lead and is also considerably higher than for samples 145 to 149 according to the invention (example 39) or 20 to 24 (example 9). Less blackening indicates a better screening effect. Samples 145 to 149 and samples 20 to 24 according to the invention screen better than lead and much better than samples 160 to 164 not according to the invention.

Example 44

Comparative

The mixture not according to the invention with the following composition is prepared from rare earths and tungsten powder and tin using the process described in example 1:

| Rare earths | Proportion in the mixture not according to the invention |
|---|---|
| Gd₂O₃ | 35% |
| Sn | 60% |
| W | 5% |

Before use, the rare earths and the tungsten and tin powders are dried for 2 hours at a temperature of 120° C. and screened through sieve 063 (tungsten through sieve 016). Then the three components are mixed in a tumble mixer for 2 hours.

Example 45

Comparative 66.1 wt. % of the previously prepared mixture not according to the invention (according to example 44) were added in 2-3 portions to 27.5 wt. % of natural rubbery TSR 5 and homogenised on a roller or in an internal mixer. Then the following were added: 2.8 wt. % of Enerthene® 1849-1, a naphthenic process oil from BP, 0.4 wt. % of Vulkanox® BKF, as antioxidant from Bayer AG, 0.4 wt. % of Vulkanox® MB, an antioxidant from Bayer AG, 0.8 wt. % of zinc oxide RS, 0.6 wt. % of stearic acid, 0.4 wt. % of Vulkacit® CZ, a vulcanisation accelerator from Bayer AG, 0.1 wt. % of Vulkacit® D, a vulcanisation accelerator from Bayer AG and 0.8 wt. % of sulfinur Rhenocure® IS 60/G 75. After renewed homogenisation, the mixture could be drawn out into a sheet on a roller or calandered. Production of the radiation-absorbing articles was achieved after pressure forming or calandering by vulcanising at temperatures between 150° C. and 170° C. and was completed in 30 minutes.

The following samples of the inorganic radiation protection mixture according to the invention from example 44 and the rubber were prepared by the process described above:

| Name | Additive content [$k_A$] | Density [$\rho_p$[ |
|---|---|---|
| Sample 175 | 66.1 wt. % | 2.272 g/cm³ |

| Name | Thickness [$d_p$] | Bulk covering [$m_A$] |
|---|---|---|
| Sample 175 | 2 mm | 0.30 g/cm² |
| Sample 176 | 4 mm | 0.60 g/cm² |
| Sample 177 | 6 mm | 0.90 g/cm² |
| Sample 178 | 8 mm | 1.20 g/cm² |
| Sample 179 | 10 mm | 1.50 g/cm² |

$m_A = k_A \cdot \rho_p \cdot d_p$
Bulk covering = proportion by weight of mixture in the sample × density of the sample × thickness of the sample Example 46

Testing the Radiation Protection Properties

Step wedges were produced from the 20 cm×20 cm×2 mm rubber sheets by glueing them together. Areas with 2, 4, 6, 8 and 10 mm thickness were produced. The step wedges were exposed to X-radiation of beam quality U=150 kV, eff. filtering 2.5 mm Al, tungsten direct current X-ray tube for 120 s and the X-ray films were evaluated densitometrically. In the following, the results of this exposure of step wedges made from the radiation-absorbing materials in this invention are given and in fact compared with step wedges made of lead. The same degree of blackening means the same degree of absorption of radiation. Less blackening indicates a better screening effect.

| Name | Thickness [$d_p$] | Bulk covering [$m_A$] | Blackening (relative units) |
|---|---|---|---|
| Sample 175 | 2 mm | 0.30 g/cm² | 4.52 |
| Sample 176 | 4 mm | 0.60 g/cm² | 1.88 |
| Sample 177 | 6 mm | 0.90 g/cm² | 1.08 |
| Sample 178 | 8 mm | 1.20 g/cm² | 0.72 |
| Sample 179 | 10 mm | 1.50 g/cm² | 0.51 |

The lead samples used for calibration and comparison samples were prepared from lead foils of grade S1 with a thickness of 0.1 mm. Step wedges like those for the samples were prepared from the lead foils. The test region covered the lead equivalents from 0.1 to 1.0 mm.

| Name | Thickness [$d_p$] | Bulk covering [$m_A$] | Blackening (relative units) |
|---|---|---|---|
| Sample 180 (lead comparison) | 0.1 mm | 0.11 g/cm² | 6.50 |
| Sample 181 (lead comparison) | 0.2 mm | 0.23 g/cm² | 6.50 |
| Sample 182 (lead comparison) | 0.3 mm | 0.34 g/cm² | 5.40 |
| Sample 183 (lead comparison) | 0.4 mm | 0.45 g/cm² | 3.68 |

-continued

| Name | Thickness [$d_p$] | Bulk covering [$m_A$] | Blackening (relative units) |
|---|---|---|---|
| Sample 184 (lead comparison) | 0.5 mm | 0.56 g/cm² | 2.65 |
| Sample 185 (lead comparison) | 0.6 mm | 0.68 g/cm² | 1.98 |
| Sample 186 (lead comparison) | 0.7 mm | 0.80 g/cm² | 1.39 |
| Sample 187 (lead comparison) | 0.8 mm | 0.91 g/cm² | 1.04 |
| Sample 188 (lead comparison) | 0.9 mm | 1.03 g/cm² | 0.83 |
| Sample 189 (lead comparison) | 1.0 mm | 1.14 g/cm² | 0.71 |

In the bulk covering range from 0.5 g/cm² to 1.4 g/cm², although the degree of blackening for samples 175 to 79 is lower than for lead, it is higher than for samples 20 to 24 according to the invention (example 9). Less blackening indicates a better screening effect. Samples 20 to 24 according to the invention screen better than lead and much better than samples 175 to 179 not according to the invention.

Example 47

66.1 wt. % of the previously prepared mixture according to the present invention (from example 7) were added in 2-3 portions to 27.5 wt. % of Natural Rubber® TSR 5 and homogenised on a roller or in an internal mixer. Then the following were added: 2.8 wt. % of Enerthene® 1849-1, a naphthenic process oil from BP, 0.4 wt. % of Vulkanox® BKF, as antioxidant from Bayer AG, 0.4 wt. % of Vulkanox® MB, an antioxidant from Bayer AG, 0.8 wt. % of zinc oxide RS, 0.6 wt. % of stearic acid, 0.4 wt. % of Vulkacit® CZ, a vulcanisation accelerator from Bayer AG, 0.1 wt. % of Vulkacit® D, a vulcanisation accelerator from Bayer AG and 0.8 wt. % of sulfur Rhenocure® IS 60/G 75. After renewed homogenisation, the mixture could be drawn out into a sheet on a roller or calandered. Production of the radiation-absorbing articles was achieved after pressure forming or calandering by vulcanising at temperatures between 150° C. and 170° C. and was completed in 30 minutes.

The following samples were prepared from the mixture according to the invention from example 7 and the rubber using the process described above:

| Name | Additive content [$k_A$] |
|---|---|
| Sample 190 | 66.1 wt. % |

Example 48

79.6 wt. % of the previously prepared mixture according to the present invention (from example 7) were added in 2-3 portions to 16.6 wt. % of Natural Rubber® TSR 5 and homogenised on a roller or in an internal mixer. Then the following were added: 1.7 wt. % of Enerthene® 1849-1, a naphthenic process oil from BP, 0.25 wt. % of Vulkanox® BKF, as antioxidant from Bayer AG, 0.25 wt. % of Vulkanox® MB, an antioxidant from Bayer AG, 0.5 wt. % of zinc oxide RS, 0.3 wt. % of stearic acid, 0.23 wt. % of Vulkacit® CZ, a vulcanisation accelerator from Bayer AG, 0.1 wt. % of Vulkacit® D, a vulcanisation accelerator from Bayer AG and 0.5 wt. % of sulfur Rhenocure® IS 60/G 75. After renewed homogenisation, the mixture could be drawn out into a sheet on a roller or calandered. Production of the radiation-absorbing articles was achieved after pressure forming or calandering by vulcanising at temperatures between 150° C. and 170° C. and was completed in 30 minutes.

The following samples were prepared from the mixture according to the invention from example 7 and the rubber using the process described above:

| Name | Additive content [$k_A$] |
|---|---|
| Sample 191 | 79.6 wt. % |

Example 49

The rubber sheets prepared with the mixture according to the example (example 7) exhibited the following mechanical properties:

| | Method | Sample 190 | Sample 191 |
|---|---|---|---|
| Tear strength, MPa: | DIN 53504 | 12.3 | 9.3 |
| Elongation at break, %: | DIN 53504 | 703 | 497 |
| Hardness, Shore A: | DIN 53505 | 41 | 62 |

The rubber sheets produced with the mixture according to the invention had very good mechanical strengths with the degrees of filling tested. That leads to the conclusion that the cross-linking reaction proceeds largely unaffected by the mixture according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture for screening radiation, comprising:
   a) at least 26 wt. % of gadolinium, said gadolinium being in elemental form, as a compound, and/or as an alloy, wherein if the gadolinium is in the form of a compound, then said compound is gadolinium(III) oxide ($Gd_2O_3$);
   b) at least 10 wt. % of one or more elements chosen, independently of each other, from the group consisting of indium, tin, molybdenum, niobium, tantalum, zirconium and tungsten, wherein the one or more elements are in elemental form, as a compound, and/or as an alloy and wherein the concentration of tungsten, if tungsten is present, is at least 10 wt. % with respect to the total amount of the mixture.

2. The mixture according to claim 1, further comprising:
   c) 0 to 64 wt. % of one or more further elements chosen, independently of each other, from the group consisting of bismuth, lanthanum, cerium, praseodymium, neodymium, promethium, samarium, europium, terbium, dysprosium, holmium, erbium, thulium, ytterbium and lutetium, wherein the one or more further elements are in elemental form, as a compound, and/or as an alloy.

3. The mixture according to claim 1, wherein a maximum of 50 wt. % of tin, with respect to the total amount of the mixture is present.

4. The mixture according to claim 1, wherein the one or more elements of component b) have a complementary radiation attenuating characteristic in the range 10 to 600 keV.

5. The mixture according to claim 1 comprising at least 35 wt. % of gadolinium and at least 20 wt. % of tungsten.

6. The mixture according to claim 1 having a specific density in the range of 4.0 to 13.0 g/cm$^3$.

7. The mixture according to claim 1, wherein the mixture comprises particles having an average particle diameter in the range 0.1 to 200 μm.

8. The mixture according to claim 2, wherein the one or more elements of b) and c) are in the form of alloys and/or compounds chosen, independently of each other, from the group consisting of oxides, carbonates, sulfates, halides, hydroxide, tungstates, carbides and sulfides.

9. A process for preparing the mixture according claim 1, comprising the steps of: drying components a) and b) in a temperature range of 20 to 500° C.; and screening and mixing components a) and b) for 5 minutes to 24 hours.

10. A substance for screening radiation comprising:
   a) the mixture according to claim 1; and
   b) at least one polymer.

11. The substance according to claim 10, further comprising one or more additive.

12. The substance according to claim 10, wherein the polymer is chosen from the group consisting of rubbers, thermoplastic materials, polyurethanes, and mixtures thereof.

13. The substance according to claim 10, wherein the degree of filling is less than 80 wt. %.

14. A substance for screening radiation comprising:
   a) 5 to 85 wt. % of rubber, thermoplastic material or polyurethane,
   b) 10 to 80 wt. % of the mixture according to claim 1, and
   c) 5 to 20 wt. % of other additives.

15. A process for preparing the substance according to claim 10, comprising reacting the polymer with the mixture.

16. The process according to claim 15, wherein the polymer is a rubber and wherein the reacting step comprises compounded the rubber with the mixture.

17. The process according to claim 15, wherein the polymer is a thermoplastic material and wherein the polymer is mixed with the mixture.

18. The process according to claim 15, wherein the polymer is polyurethane and the starting materials for the polyurethane are mixed directly with the mixture and then polymerized.

19. A product comprising the substance according to claim 10.

* * * * *